(12) United States Patent
Ahmad

(10) Patent No.: US 9,036,508 B2
(45) Date of Patent: May 19, 2015

(54) LAYER TWO EXTENSIONS

(75) Inventor: Syed A. Ahmad, Ashburn, VA (US)

(73) Assignee: VERIZON PATENT AND LICENSING INC., Basking Ridge, NJ (US)

(*) Notice: Subject to any disclaimer, the term of this patent is extended or adjusted under 35 U.S.C. 154(b) by 353 days.

(21) Appl. No.: 13/408,664

(22) Filed: Feb. 29, 2012

(65) Prior Publication Data

US 2013/0223287 A1    Aug. 29, 2013

(51) Int. Cl.
*H04L 12/28*    (2006.01)
*H04J 3/26*    (2006.01)
*H04J 3/16*    (2006.01)
*G06F 15/16*    (2006.01)
*G06F 15/173*    (2006.01)
*H04L 12/46*    (2006.01)

(52) U.S. Cl.
CPC ................ *H04L 12/465* (2013.01)

(58) Field of Classification Search
CPC ......... H04L 12/28; H04L 45/00; H04L 45/02; H04L 45/04; H04L 43/12
USPC .............. 370/255, 392, 228, 401, 256, 390, 370/395.53, 397, 409, 432, 469
See application file for complete search history.

(56) References Cited

U.S. PATENT DOCUMENTS

| | | | | |
|---|---|---|---|---|
| 6,661,791 | B1 * | 12/2003 | Brown ........................ | 370/392 |
| 7,639,699 | B2 * | 12/2009 | Tallet et al. ................ | 370/401 |
| 7,817,633 | B1 * | 10/2010 | Parker et al. ................ | 370/392 |
| 8,340,131 | B2 * | 12/2012 | Sharp et al. ................ | 370/474 |
| 8,467,399 | B2 * | 6/2013 | Tadimeti et al. ............ | 370/401 |
| 8,503,445 | B2 * | 8/2013 | Lo et al. ..................... | 370/389 |
| 2005/0027778 | A1 * | 2/2005 | Dimitrelis et al. ........... | 709/200 |
| 2008/0316919 | A1 * | 12/2008 | Shi et al. .................... | 370/223 |
| 2011/0029645 | A1 * | 2/2011 | Baykal et al. ............... | 709/221 |
| 2011/0177786 | A1 * | 7/2011 | Marano et al. ............ | 455/67.11 |
| 2011/0222428 | A1 * | 9/2011 | Charbit et al. .............. | 370/252 |
| 2012/0131197 | A1 * | 5/2012 | Prentice et al. ............. | 709/226 |
| 2012/0215933 | A1 * | 8/2012 | Liu ............................. | 709/230 |
| 2012/0294154 | A1 * | 11/2012 | Missett et al. ............ | 370/241.1 |

* cited by examiner

*Primary Examiner* — Alpus H Hsu
*Assistant Examiner* — Anthony Luo

(57) ABSTRACT

A network device may be configured to define a Layer 2 domain, wherein the Layer 2 domain defines a data link layer broadcast domain and assign an access interface to the Layer 2 domain. The network device may be further configured to assign a double Virtual Local Area Network (VLAN) identifier to the access interface in the Layer 2 domain, wherein the double VLAN identifier includes an inner VLAN identifier and an outer VLAN identifier, receive a data unit via the access interface, wherein the data unit includes the double VLAN identifier, and associate the data unit with the defined Layer 2 domain, based on the data unit being received via the access interface and based on the data unit including the assigned double VLAN identifier.

27 Claims, 15 Drawing Sheets

LAYER TWO EXTENSIONS

BACKGROUND INFORMATION

Communication across networks may be based on the Open Systems Interconnection (OS) model. In the OSI model, Layer 2 may correspond to the data link layer, which may govern the exchange of data between network devices on a same network. A common Layer 2 architecture, associated with Local Area Networks (LANs), is based on the Ethernet set of technologies. Devices on an Ethernet network may exchange data using data units known as Ethernet frames. An Ethernet network may correspond to a single broadcast domain. Devices in the same broadcast domain may communicate with each other at the data link layer. Distinct broadcast domains may be generated by creating Virtual LANs (VLANs) on the Ethernet network. However, the number of VLANs that may exist within an Ethernet network may be limited.

DETAILED DESCRIPTION OF PREFERRED EMBODIMENTS

Figure 1:
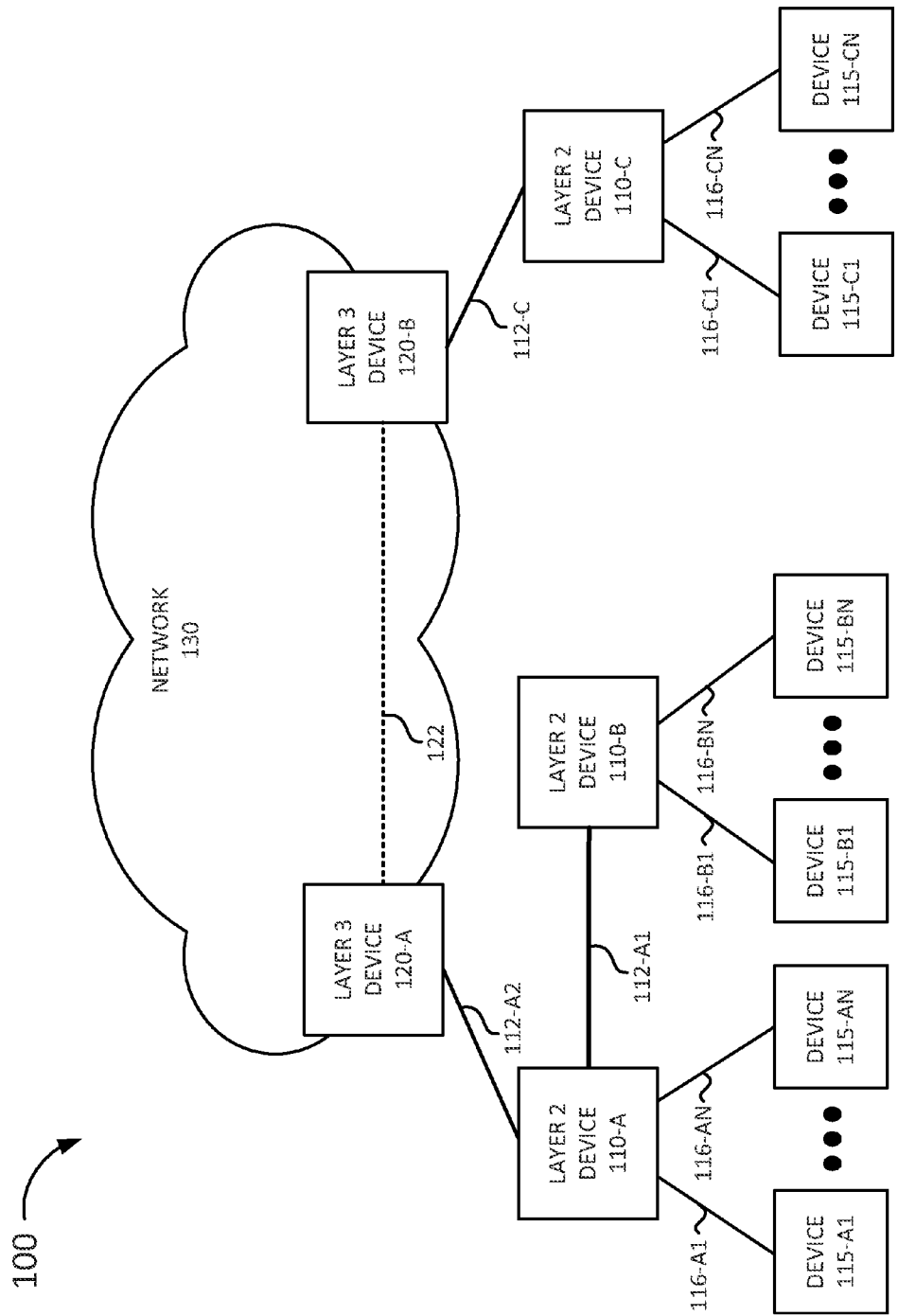
FIG. 1 is a diagram illustrating an exemplary environment according to an implementation described herein.

The following detailed description refers to the accompanying drawings. The same reference numbers in different drawings identify the same or similar elements.

Layer 2 separation in a network may be maintained by assigning different devices to different VLANs. At a Layer 2 device, such as a switch, different interfaces, corresponding to different devices, may be assigned to different VLANs. Thus, for example, interfaces A and B may be assigned to VLAN 1 and interfaces C and D may be assigned to VLAN 2. Data units (e.g., Ethernet frames) labeled with a VLAN 1 identifier may only be sent via interfaces assigned to VLAN 1 and data units labeled with a VLAN 2 identifier may only be sent via interfaces assigned to VLAN 2. A VLAN identifier may be part of an Institute of Electrical and Electronics Engineers (IEEE) 802.1Q header of an Ethernet frame and may be limited to 12 bits. The 12 bit VLAN identifier may be fixed by the 802.1Q standard and device hardware may be designed to process 12 bit VLAN identifiers. However, the 12 bit VLAN identifier may limit the number of VLANs on a network to 4,096 VLANs ($2^{12}$=4,096). It may be necessary to exceed this limit. For example, a network provider may use Layer 2 separation to keep traffic associated with different customers separate, and the network provider may need to service more than 4,096 customers on a network.

An implementation described herein may relate to extensions to Layer 2 functionality. Layer 2 separation may be implemented using Layer 2 domains. A Layer 2 domain may be defined on a Layer 2 device and the Layer 2 domain may define a broadcast domain. An interface may be assigned to the Layer 2 domain and a VLAN identifier may be assigned to the interface and may be associated with the Layer 2 domain. Ethernet frames received via the assigned interface and including the assigned VLAN identifier may be determined to be associated with the Layer 2 domain. Thus, different Layer 2 domains may receive frames via a particular interface as long as different VLAN identifiers are assigned to the particular interface for the different Layer 2 domains. Furthermore, different Layer 2 domains may use the same VLAN identifier on different interfaces and a particular Layer 2 domain may use different VLAN identifiers on different interfaces. There may not be an inherent limit to the number of Layer 2 domains that may be defined on a particular device. Therefore, the use of Layer 2 domains may be used to exceed the limit of 4,096 separate broadcast domains imposed by the 12 bit VLAN identifier. In one implementation, a Layer 2 domain may be defined by a defining a bridge domain. In another implementation, a Layer 2 domain may be defined using another technique.

While the use of Layer 2 domains may overcome the limit of the number of broadcast domains on a device, there may be a need to overcome a limit of the number of broadcast domains over a wire. For example, two Layer 2 devices may be connected by a trunk interface. The trunk interface may need to be able to transmit traffic associated with all broadcast domains defined on the two Layer 2 devices. Thus, since each Layer 2 domain may need to use a different VLAN identifier for a particular interface, the number of Layer 2 domains on a Layer 2 device may exceed the number of available VLAN identifiers for the trunk interface.

Additional VLAN identifiers may be provisioned with the use of a double VLAN identifier. While the IEEE 802.1ad specification allows a single VLAN header to be inserted into an Ethernet frame, the 802.1QinQ architecture allows the use of nested VLAN identifiers, allowing a hierarchy of VLANs, wherein VLANs may be defined within a particular VLAN by adding an additional VLAN identifier to an Ethernet frame. However, in an 802.1QinQ architecture, each 12 bit VLAN identifier is used in a separate identification step. Thus, a first VLAN identifier may be used to identify a first VLAN, and a second VLAN identifier may be used to identify a second VLAN defined within the first VLAN.

An implementation described herein may relate to using a double VLAN identifier in a single identification step. A double VLAN identifier may include an inner VLAN identifier and an outer VLAN identifier and may be used to identify a particular Layer 2 domain on a particular interface. The use of a double VLAN identifier to identify a particular Layer 2 domain over a wire may be used to overcome the limit of the number of broadcast domains over a wire imposed by a 12 bit VLAN identifier.

An implementation described herein may further relate to configuring a Layer 2 device to include Layer 2 domains and/or configuring a Layer 3 device to associate a routing instance with a Layer 2 domain. An implementation described herein may further relate to forwarding data units through a Layer 2 device and/or a Layer 3 device, while maintaining Layer 2 separation between data units associated with different Layer 2 domains.

An implementation described herein may further relate to Layer 2 domain trunking. Layer 2 domain trunking may correspond to management of trunk links between Layer 2 devices and/or between a Layer 2 device and a Layer 3 device. A Layer 2 domain trunking process may include the propagation of changes in a Layer 2 domain configuration across a network via trunk links. For example, if a new Layer 2 domain is defined on a Layer 2 device, an advertisement message may be sent via trunk interfaces of the Layer 2 device to inform other Layer 2 devices and/or Layer 3 devices of the new Layer 2 domain.

FIG. 1 is a diagram of an exemplary environment 100 in which the systems and/or methods described herein may be implemented. As shown in FIG. 1, environment 100 may include one or more Layer 2 devices 110 (referred to herein collectively as "Layer 2 devices 110" and individually as "Layer 2 device 110"), one or more devices 115 (referred to herein collectively as "devices 115" and individually as "device 115"), one or more Layer 3 devices (referred to herein collectively as "Layer 3 devices 120" and individually as "Layer 3 device 120"), and a network 130.

Layer 2 device 110 may include any device capable of processing and forwarding data at the data link layer. For example, Layer 2 device 110 may include a switch, a multiport bridge, a Layer 2 firewall, or another type of Layer 2 device. Layer 2 device 110 may receive a data unit at a particular input port, may determine a particular output port for the data unit, and may forward the data unit via the output port. Layer 2 device 110 may include one or more Layer 2 domains and may maintain Layer 2 separation between different Layer 2 domains.

Layer 2 device 110 may be connected to another Layer 2 device 110, or to a Layer 3 device 120, via a trunk link 112 (referred to herein collectively as "trunk links 112" and individually as "trunk link 112"). For example, Layer 2 device 110-A may be connected to Layer 2 device 110-B via trunk link 112-A1. As another example, Layer 2 device 110-A may be connected to Layer 3 device 120-A via trunk link 112-A2.

Trunk link 112 may forward traffic for all Layer 2 domains associated with the destination Layer 2 device 110 or Layer 3 device 120. Advertisements about a change in a Layer 2 domain configuration may be sent via trunk links 112.

Layer 2 device 110 may be connected to device 115 via an access link 116 (referred to herein collectively as "access links 116" and individually as "access link 116"). For example, device 115-A1 may be connected to Layer 2 device 110-A via access link 116-A1. Layer 2 device 110-A and Layer 2 device 110-B may be part of the same broadcast domain. For example, device 115-A1 and device 115-B1 may be part of the same Layer 2 domain. If device 115-A1 needs to communicate with device 115-131, device 115-A1 may send an Ethernet frame via access link 116-A1. Layer 2 device 110-A may forward the Ethernet frame via trunk link 112-A1 and Layer 2 device 110-B may forward the Ethernet frame to device 115-B1 via access link 116-B1.

Device 115 may include any device with communication functionality, such as, for example, a personal computer or workstation; a server device; a portable computer; a printer, fax machine, or another type of physical medium output device; a television, a projector, a speaker, or another type of a display or audio output device; a set-top box; a gaming system; a camera, a video camera, a microphone, a sensor, or another type of input or content recording device; a portable communication device (e.g. a mobile phone, a smart phone, a tablet computer, a global positioning system (GPS) device, and/or another type of wireless device); a voice over Internet Protocol (VoIP) telephone device; a radiotelephone; a gateway, a router, a switch, a firewall, a network interface card (NIC), a hub, a bridge, a proxy server, or another type of firewall device; a line terminating device, such as an add-drop multiplexer or an optical network terminal; a cable modem; a cable modem termination system; and/or any type of device with communication capability.

Layer 3 device 120 may include any device capable of processing and forwarding data at the network layer. For example, Layer 3 device 120 may include a router, a gateway, a Layer 3 firewall, and/or another type of Layer 3 device. Layer 3 device 120 may route data units between different broadcast domains (e.g., between different Layer 2 domains). Thus, if a device wants to communicate with another device that is associated with a different domain, the device may need to communicate with the other device through a Layer 3 device 120. Layer 3 device 120 may receive a data unit, such a an Internet Protocol (IP) packet, at a particular input port, may determine a particular output port for the data unit, and may forward the data unit via the output port. Layer 3 device 120 may perform Layer 2 functions (e.g., functions performed by Layer 2 device 110) in addition to Layer 3 functions.

Layer 3 device 120 may maintain Layer 2 separation when communicating with another Layer 3 device 120. For example, Layer 3 device 120 may maintain a particular routing instance for a particular Layer 2 domain. Thus, a first data unit, associated with a first Layer 2 domain, may be routed based on a first routing instance, and a second data unit, associated with a second Layer 2 domain, may be routed based on a second routing instance, different from the first routing instance.

Layer 3 device 120-A may be connected to Layer 3 device 120-B via a virtual connection 122 through network 130. Network 130 may include a packet-switched network, a circuit-switched network, or a combination thereof. For example, network 130 may include a local area network (LAN), a wide area network (WAN), a metropolitan area network (MAN), an ad hoc network, an intranet, a fiber optic-based network (e.g., a fiber optic service network), a wireless network (e.g., a cellular network, the Public Land Mobile Network (PLMN), a second generation (2G) network, a third generation (3G) network, a fourth generation (4G) network (e.g., a long term evolution (LTE) network), a fifth generation (5G) network, a code division multiple access (CDMA) network, a global system for mobile communications (GSM) network, a general packet radio services (GPRS) network, a combination of thereof), and/or a combination of these or other types of networks.

Virtual connection 122 may correspond to a tunnel or a label-switched path. For example, virtual connection 122 may correspond to a Multi-Protocol Label Switching (MPLS) path, a General Routing Encapsulation (GRE) tunnel, an IP Security (IPSec) tunnel, and/or another type of virtual connection. Another Layer 3 device 120 that may be reached via virtual connection 122 may be referred to as a route target Layer 3 device.

Virtual connection 122 may enable a virtual private network (VPN) to be established between remote Layer 2 networks that may enable devices on the VPN to communicate as if connected to the same Layer 2 network. For example, if device 115-A1 needs to communicate with device 115-C1, device 115-A1 may generate an Ethernet frame that includes the destination Media Access Control (MAC) address of device 115-C1 and send the Ethernet frame via access link 116-A1. Layer 2 device 110-A may receive an Ethernet frame via access link 116-A1 and may forward the frame to Layer 3 device 120-A via trunk link 112-A2. Layer 3 device 120-A may determine that device 115-C1 may be reached via Layer 3 device 120-B. Layer 3 device 120-A may add, for example, an MPLS label associated with Layer 3 device 120-B to the Ethernet frame, may encapsulate the Ethernet frame in an IP packet, and may send the IP packet to Layer 3 device 120-B via virtual connection 122. There may be additional intervening Layer 3 devices 120 (e.g., routers) between Layer 3 device 110-A and Layer 3 device 110-B (not shown in FIG. 1) and the IP packet may be routed via these additional Layer 3 devices 120, based on the MPLS label, to Layer 3 device 120-B. Layer 3 device 120-B may retrieve the Ethernet frame from the IP packet, may forward the Ethernet frame to Layer 2 device 110-C and Layer 2 device 110-C may forward the Ethernet frame to device 115-C1. Thus, Layer 2 device 110-A and Layer 2 device 110-C may behave as if there was a direct trunk link connecting the two devices.

Furthermore, while virtual connection 122 is shown in FIG. 1 as connecting Layer 3 device 120-A and Layer 3 device 120-B across a network 130, in another implementation, virtual connection 122 may connect two Layer 3 devices 120 across different networks (e.g., different Autonomous Systems (AS)). For example, if Layer 3 device 120-A is in a first network and Layer 3 device 120-B is in a second network, an IP tunnel may be established across the two networks using, for example, Generic Tunnel Encapsulation (GRE). The established IP tunnel may be used to run Label Distribution Protocol (LDP) to establish MPLS transport between the two Layer 3 devices 120 and the MPLS transport may be used to establish virtual connection 122, which may cause the two Layer 3 devices 120 to act as if on the same network.

Although FIG. 1 shows exemplary components of environment 100, in other implementations, environment 100 may include fewer components, different components, differently arranged components, or additional components than depicted in FIG. 1. Additionally or alternatively, one or more components of environment 100 may perform functions described as being performed by one or more other components of environment 100.

Figure 2:
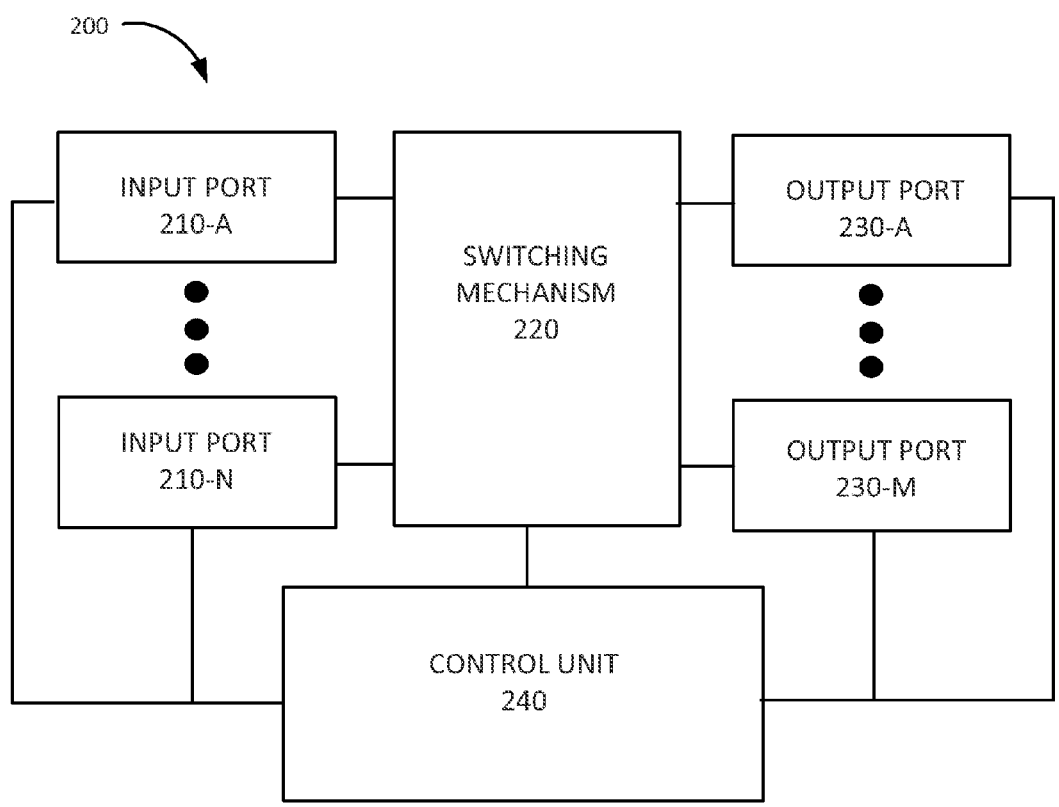
FIG. 2 is a diagram illustrating exemplary components of the Layer 2 device or the Layer 3 device of FIG. 1.

FIG. 2 is a diagram illustrating example components of a device 200. Device 200 may correspond to Layer 2 device 110 or to Layer 3 device 120. As shown in FIG. 2, device 200 may include one or more input ports 210-A to 210-N (referred to herein individually as "input port 210" and collectively as "input ports 210"), a switching mechanism 220, one or more output ports 230-A to 230-M (referred to herein individually as "output port 230" and collectively as "output ports 230"), and/or a control unit 240.

Input ports 210 may be the points of attachments for physical links and may be the points of entry for incoming traffic. An input port 210 may be associated with an interface card and may be associated with an interface of device 200. Input port 210 may perform some or all of data plane processing associated with an incoming packet. Data plane processing may encompass looking up a destination address for an incoming data unit, removing or changing a label associated with the data unit, determining a path through switching mechanism 220, and/or filter the data unit based on one or more firewall filters.

Switching mechanism 220 may include one or more switching planes and/or fabric cards to facilitate communication between input ports 210 and output ports 230. In one implementation, each of the switching planes and/or fabric cards may include a single or multi-stage switch of crossbar elements. In another implementation, each of the switching planes may include some other form(s) of switching elements. Additionally or alternatively, switching mechanism 220 may include one or more processors, one or more memories, and/or one or more paths that permit communication between input ports 210 and output ports 230.

Output ports 230 may store traffic received from input ports 210 and may schedule the traffic on one or more output physical links. An output port 230 may be associated with an interface card and may be associated with an interface of device 200. Output port 230 may perform some or all of data plane processing associated with an outgoing data unit. For example, output port 230 may classify the data unit based on a quality of service class, schedule the data unit in a particular queue, add or change a label associated with the data unit, and/or filter the packet based on one or more firewall filters.

While input ports 210 and output ports 230 are shown in FIG. 2 as distinct for illustrative purposes, a particular input port 210 may also function as an output port and a particular output port 230 may also function as an input port. A particular input port 210 or output port 230 may function as an access interface by being associated with access link 116. Alternatively, a particular input port 210 or output port 230 may function as a trunk interface by being associated with trunk link 112.

Control unit 240 may interconnect with input ports 210, switching mechanism 220, and/or output ports 230 and may control operation of device 200. For example, control unit 240 may perform control plane operations associated with device 200 (e.g., control unit 240 may use routing protocols and may create one or more routing tables and/or one or more forwarding tables that are used in traffic forwarding).

Although FIG. 2 shows example components of device 200, in other implementations, device 200 may include fewer components, different components, differently arranged components, and/or additional components than depicted in FIG. 2. Additionally or alternatively, one or more components of device 200 may perform one or more tasks described as being performed by one or more other components of device 200.

Figure 3:
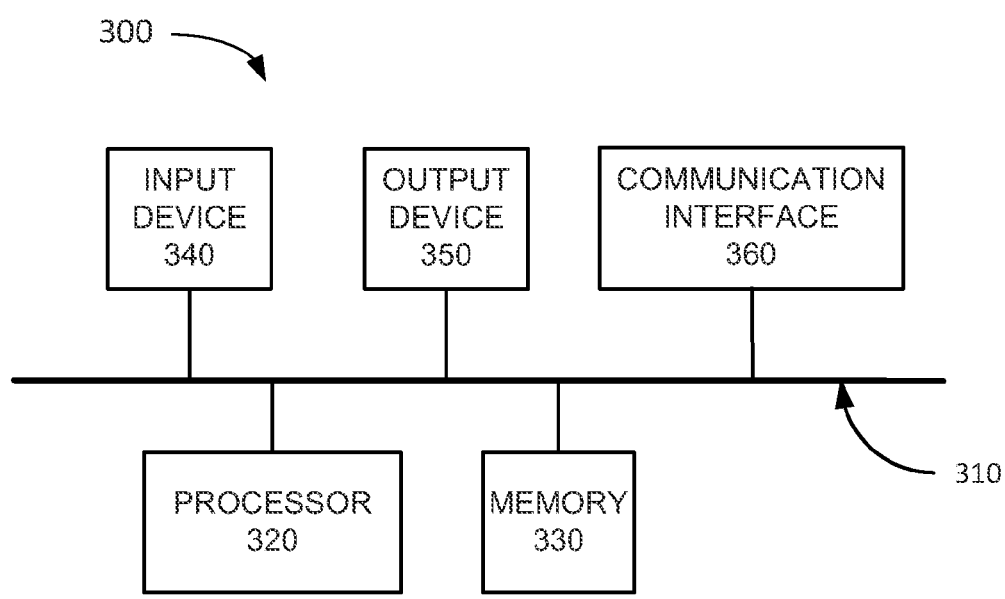
FIG. 3 is a diagram illustrating exemplary components of a device that may be included in one or more components of FIG. 1.

FIG. 3 is a diagram illustrating exemplary components of a device 300 according to an implementation described herein. Layer 2 device 110 or Layer 3 device 120 (e.g., control unit 240 of device 200) or device 115 may each include one or more devices 300. As shown in FIG. 3, device 300 may include a bus 310, a processor 320, a memory 330, an input device 340, an output device 350, and a communication interface 360.

Bus 310 may include a path that permits communication among the components of device 300. Processor 320 may include any type of single-core processor, multi-core processor, microprocessor, latch-based processor, and/or processing logic (or families of processors, microprocessors, and/or processing logics) that interprets and executes instructions. In other embodiments, processor 320 may include an application-specific integrated circuit (ASIC), a field-programmable gate array (FPGA), and/or another type of integrated circuit or processing logic.

Memory 330 may include any type of dynamic storage device that may store information and/or instructions, for execution by processor 320, and/or any type of non-volatile storage device that may store information for use by processor 320. For example, memory 330 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 340 may allow an operator to input information into device 300. Input device 340 may include, for example, a keyboard, a mouse, a pen, a microphone, a remote control, an audio capture device, an image and/or video capture device, a touch-screen display, and/or another type of input device. In some embodiments, device 300 may be managed remotely and may not include input device 340. In other words, device 300 may be "headless" and may not include a keyboard, for example.

Output device 350 may output information to an operator of device 300. Output device 350 may include a display, a printer, a speaker, and/or another type of output device. For example, device 300 may include a display, which may include a liquid-crystal display (LCD) for displaying information. In some embodiments, device 300 may be managed remotely and may not include output device 350. In other words, device 300 may be "headless" and may not include a display, for example.

Communication interface 360 may include a transceiver that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 360 may include a transmitter that converts baseband signals to radio frequency (RF) signals and/or a receiver that converts RF signals to baseband signals. Communication interface 360 may be coupled to an antenna for transmitting and receiving RF signals.

Communication interface 360 may include a logical component that includes input and/or output ports, input and/or output systems, and/or other input and output components that facilitate the transmission of data to other devices. For example, communication interface 360 may include a network interface card (e.g., Ethernet card) for wired communications and/or a wireless network interface (e.g., a WiFi) card for wireless communications. Communication interface 360 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 300 may perform certain operations relating to configuring a Layer 2 domain, updating a Layer 2 domain configuration, and/or advertising a change in a Layer 2 domain configuration. Device 300 may perform these operations in response to processor 320 executing software instructions contained in a computer-readable medium, such as memory 330. A computer-readable medium may be defined as a non-transitory memory device. A memory device may be implemented within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of, or in combination with, software instructions to implement processes described herein. Thus, implementations described herein are not limited to any specific combination of hardware circuitry and software.

Although FIG. 3 shows exemplary components of device 300, in other implementations, device 300 may include fewer components, different components, additional components, or differently arranged components than depicted in FIG. 3. Additionally or alternatively, one or more components of device 300 may perform one or more tasks described as being performed by one or more other components of device 300.

Figure 4A:
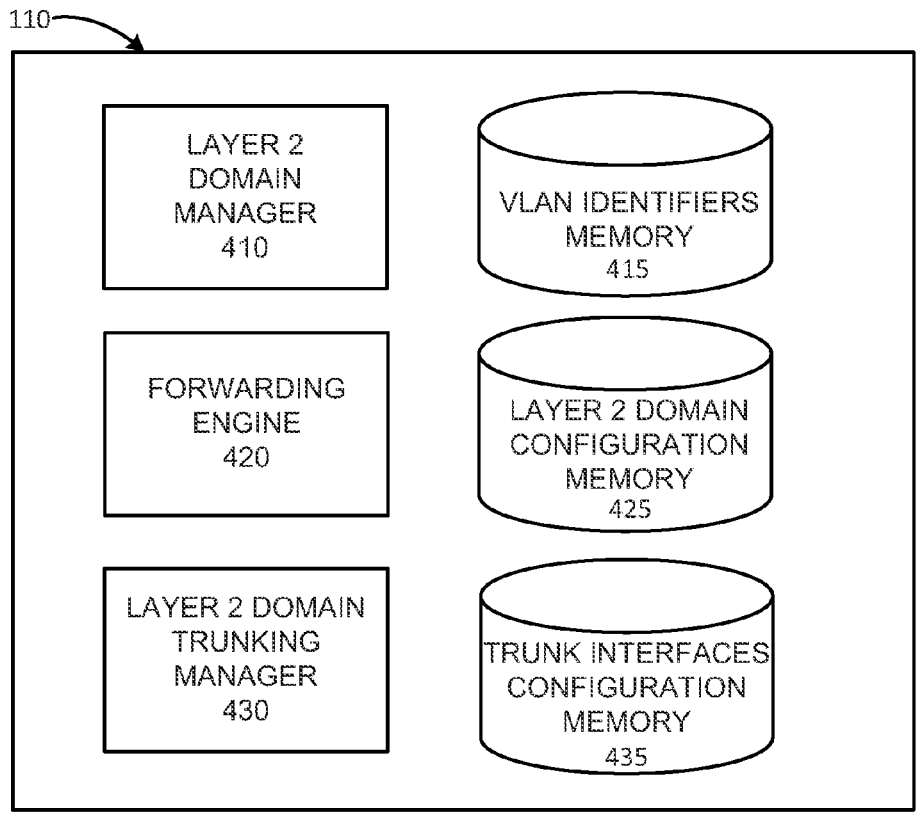
FIG. 4A is a diagram illustrating exemplary functional components of the Layer 2 device of FIG. 1.

FIG. 4A is a diagram illustrating exemplary functional components of Layer 2 device 110. The functional components of Layer 2 device 110 may be implemented, for example, via processor 320 executing instructions from memory 330. Alternatively, some or all of the functional components of Layer 3 device 120 may be implemented via hardwired logic. As shown in FIG. 4A, Layer 2 device 110 may include a Layer 2 domain manager 410, a forwarding engine 420, a Layer 2 domain trunking manager 430, a VLAN identifiers memory 415, a Layer 2 domain configuration memory 425, and a trunk interfaces configuration memory 435.

Layer 2 domain manager 410 may define a new Layer 2 domain on Layer 2 device 110, may delete an existing Layer 2 domain, may rename an existing Layer 2 domain, and/or may otherwise modify an existing Layer 2 domain. Layer 2 domain manager 410 may assign a particular access or trunk interface to a Layer 2 domain, and may assign a particular VLAN identifier to the particular access or trunk interface for the Layer 2 domain by selecting an available VLAN identifier from VLAN identifiers memory 415. VLAN identifiers memory 415 may store information about available VLAN identifiers for each interface of Layer 2 device 110.

Forwarding engine 420 may forward data units. For example, forwarding engine 420 may receive a data unit via an interface, may identify a Layer 2 domain associated with the data unit, may access a forwarding table associated with the identified Layer 2 domain, may determine an output interface based on the destination address included in the data unit in the accessed forwarding table, and may forward the data unit via the determined output interface. If the destination address cannot be found in the forwarding table, or if the data unit corresponds to a broadcast data unit, forwarding engine 420 may broadcast the data unit via all interfaces associated with the identifier Layer 2 domain.

Layer 2 domain configuration memory 425 may store information about Layer 2 domains defined on Layer 2 device 110. Exemplary information that may be stored in Layer 2 domain configuration memory 425 is described below with reference to FIG. 5A.

Layer 2 domain trunking manager 430 may manage trunk links associated with Layer 2 device 110. For example, Layer 2 domain trunking manager 430 may determine whether a particular Layer 2 domain should be associated with a particular trunk interface. Trunk interfaces configuration memory 435 may store information that associates trunk interfaces with Layer 2 domains. Layer 2 domain trunking manager 430 may receive an advertisement message via a trunk interface indicating a change in a Layer 2 domain configuration and may update trunk interfaces configuration memory 435 based on the received advertisement message. For example, Layer 2 domain trunking manager 430 may receive, via a particular trunk interface, an indication that a particular Layer 2 domain has been defined on a Layer 2 device reachable via the particular trunk interface. In response, Layer 2 domain trunking manager 430 may associate the particular trunk interface with the particular Layer 2 domain. Layer 2 domain trunking manager may also detect a change in Layer 2 domain configuration in Layer 2 device 110, may generate an advertisement message with information about the detected change, and may forward the advertisement message via all trunk interfaces.

Although FIG. 4A shows exemplary functional components of Layer 2 device 110, in other implementations, Layer 2 device 110 may include fewer functional components, different functional components, differently arranged functional components, or additional functional components than depicted in FIG. 4A. Additionally or alternatively, one or more functional components of Layer 2 device 110 may perform functions described as being performed by one or more other functional components of Layer 2 device 110.

Figure 4B:
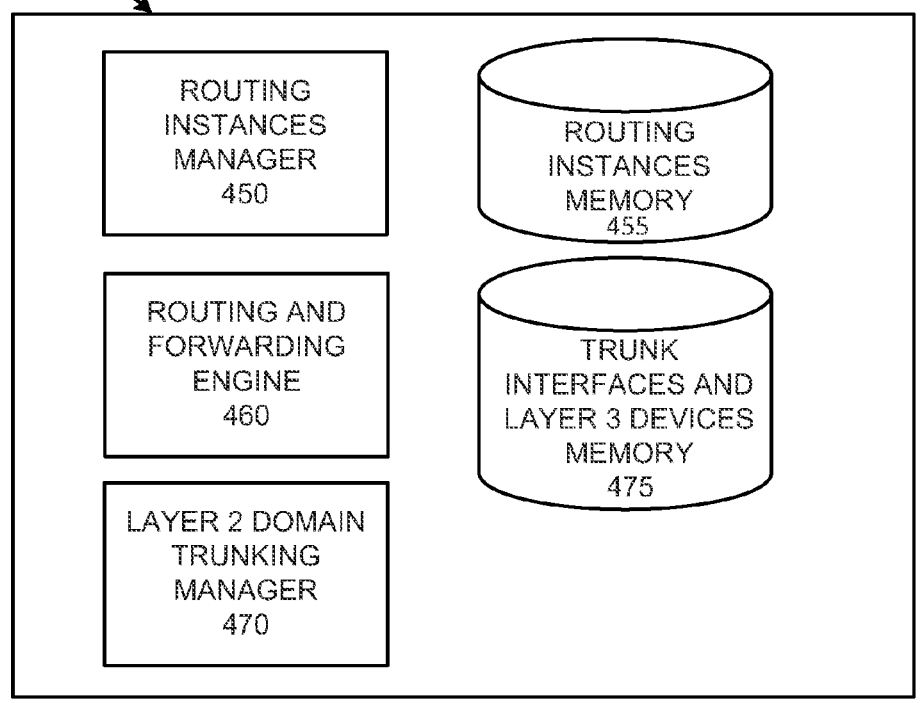
FIG. 4B is a diagram illustrating exemplary functional components of the Layer 3 device of FIG. 1.

FIG. 4B is a diagram illustrating exemplary functional components of Layer 3 device 120. The functional components of Layer 3 device 120 may be implemented, for example, via processor 320 executing instructions from memory 330. Alternatively, some or all of the functional components of Layer 3 device 120 may be implemented via hardwired logic. As shown in FIG. 4B, Layer 3 device 120 may include a routing instances manager 450, a routing instance memory 455, a routing and forwarding engine 460, a Layer 2 trunking manager 470, and a trunk interfaces and Layer 3 devices memory 475.

Routing instances manager 450 may manage L2D routing instances (e.g., Virtual Routing and Forwarding (VRF) instance, Virtual Private LAN Service (VPLS) instance, etc.) defined on Layer 3 device 120. For example, routing instances manager 450 may define a routing instance for a Layer 2 domain and may use the routing instance for routing data units, associated with the Layer 2 domain, to another Layer 3 device 120 that is also associated with the Layer 2 domain. Routing instances manager 450 may assign a particular Layer 3 device 120 to a Layer 2 domain, and may assign a particular VLAN identifier to the particular Layer 3 device 120 for the Layer 2 domain. Routing instance manager 450 may access routing instances memory 455 when routing data units, associated with a Layer 2 domain, to another Layer 3 device 120.

Routing instance memory 455 may store information about routing instances defined on Layer 3 device 120. Exemplary information that may be stored in routing instance memory 455 is described below with reference to FIG. 5B.

Routing and forwarding engine 460 may route data units through network 130. For example, routing and forwarding engine 460 may receive a data unit via an interface, may identify a Layer 2 domain associated with the data unit, may identify a routing instance associated with the identifier Layer 2 domain, may access a routing and forwarding table associated with the identified routing instance, may determine an output interface based on the destination address included in the data unit in the accessed routing and forwarding table, and may forward the data, unit via the determined output interface. If the destination address cannot be found in the routing and forwarding table, or if the data unit corresponds to a broadcast data unit, routing and forwarding engine 460 may broadcast the data unit via all interfaces associated with the identifier Layer 2 domain.

Layer 2 trunking manager 470 may perform functions similar to the functions described above with reference to Layer 2 trunking manager 430 of Layer 2 device 110. Additionally, Layer 2 trunking manager 470 may perform these functions with respect to Layer 3 devices 120. For example, Layer 2 trunking manager 470 may receive an advertisement message from another Layer 3 device, indicating that a new Layer 2 domain has been created on the other Layer 3 device. In response, Layer 2 trunking manager 470 may associate the new Layer 2 domain with the other Layer 3 device in trunk interfaces and Layer 3 devices memory 475. Trunk interfaces and Layer 3 devices memory 475 may store information that associates particular trunk interfaces, or particular Layer 3 devices, with particular Layer 2 domains.

Although FIG. 4B shows exemplary functional components of Layer 3 device 120, in other implementations, Layer 3 device 120 may include fewer functional components, different functional components, differently arranged functional components, or additional functional components than depicted in FIG. 4B. Additionally or alternatively, one or more functional components of Layer 3 device 120 may perform functions described as being performed by one or more other functional components of Layer 3 device 120.

Figure 5A:
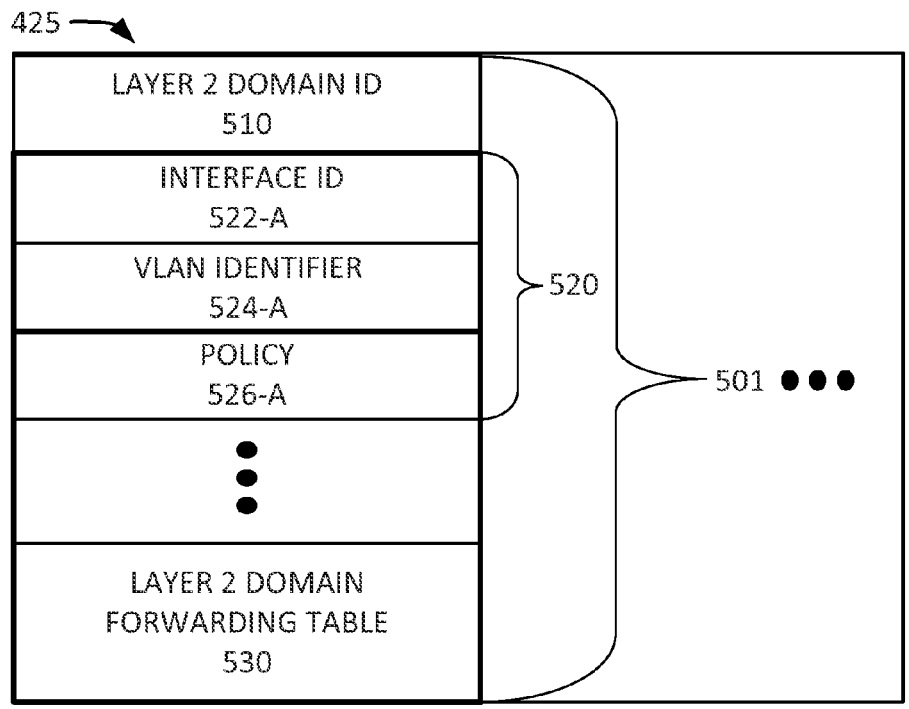
FIG. 5A is a diagram of exemplary components that may be stored in the Layer 2 domain configuration memory of FIG. 4A.

FIG. 5A is a diagram of exemplary components that may be stored in Layer 2 domain configuration memory 425. As shown in FIG. 5A, Layer 2 domain configuration memory 425 may include one or more Layer 2 domain records 501 (referred to herein collectively as "Layer 2 domain records 501" and individually as "Layer 2 domain record 501"). Layer 2 domain record 501 may include information about a particular Layer 2 domain configured on Layer 2 device 110.

Layer 2 domain record 501 may include a Layer 2 domain identifier (ID) field 510, one or more interface fields 520, and a Layer 2 domain forwarding table 530. Layer 2 domain ID field 510 may store an ID that uniquely identifies a particular Layer 2 domain, such as a name of the particular Layer 2 domain.

Interface field 520 may store information about a particular interface associated with the particular Layer 2 domain. The particular interface may correspond to an access interface or a trunk interface. Interface field 520 may include an interface ID field 522, a VLAN identifier field 524, and a policy field 526. Interface ID field 522 may store an ID that uniquely identifies the particular interface, such as the name of the interface. VLAN identifier field 524 may store information about a particular VLAN identifier associated with the particular interface in the Layer 2 domain. Policy field 526 may store information about a particular policy associated with the particular interface field 520.

Multiple interface fields 520 may be exist for a particular interface in a Layer 2 domain record 501. For example, first interface field 520 may include a first VLAN identifier and a first policy for the particular interface and a second interface field 520 may store a second VLAN identifier and a second policy. For example, the first VLAN identifier may identify trusted data units and the second VLAN identifier may identify untrusted data units. The trusted data units may be associated with a policy that forward the trusted data units to their destination, while the untrusted data units may be associated with a policy that forwards the untrusted data units to a firewall device.

Layer 2 domain forwarding table 530 may include a forwarding table associated with the particular Layer 2 domain. For example, Layer 2 domain forwarding table 530 may relate a particular destination address (e.g., MAC address) with a particular output interface.

Although FIG. 5A shows exemplary components of Layer 2 domain configuration memory 425, in other implementations, Layer 2 domain configuration memory 425 may include fewer fields, different fields, differently arranged fields, or additional fields than depicted in FIG. 5A.

Figure 5B:
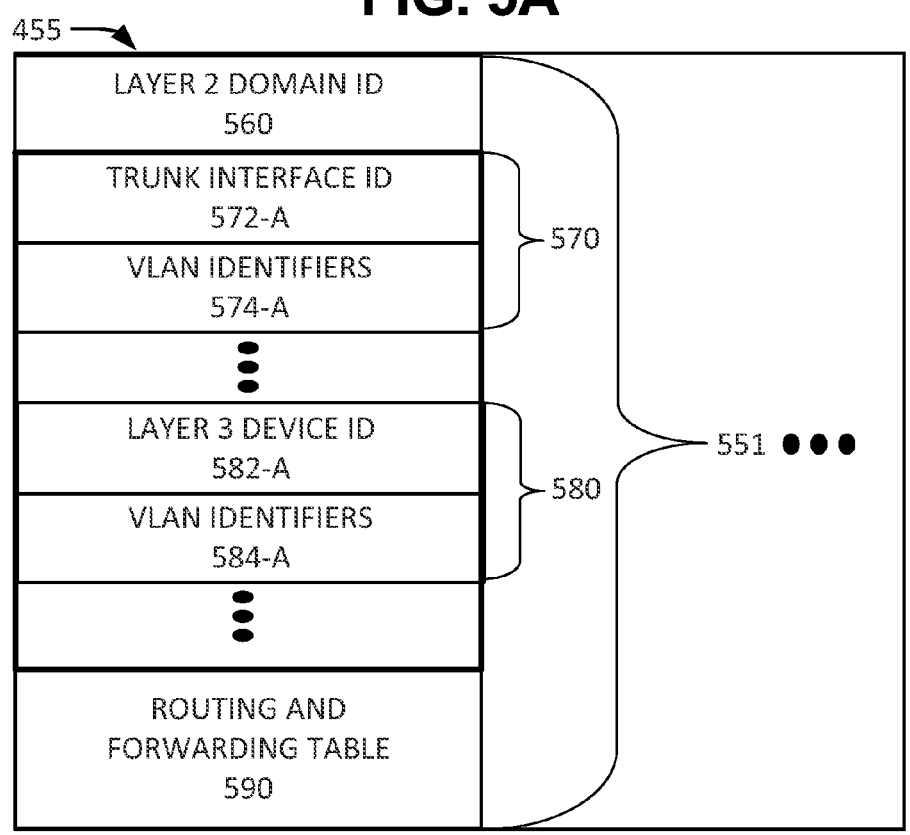
FIG. 5B is a diagram of exemplary components that may be stored in the routing instances memory of FIG. 4B.

FIG. 5B is a diagram of exemplary components that may be stored in routing instances memory 455. As shown in FIG. 5B, routing instances memory 455 may include one or more routing instance records 551 (referred to herein collectively as "routing instance records 551" and individually as "routing instance record 551"). Routing instance record 551 may include information about a particular routing instance, associated with a particular Layer 2 domain, configured on Layer 3 device 120.

Routing instance record 551 may include a Layer 2 domain identifier (ID) field 560, one or more trunk interface fields 570, one or more Layer 3 device field 580, and a routing and forwarding table field 590. Layer 2 domain ID field 560 may store an ID that uniquely identifies a particular Layer 2 domain, such as a name of the particular Layer 2 domain.

Trunk interface field 570 may store information about a particular trunk interface associated with the particular Layer 2 domain. Trunk interface field 570 may include a trunk interface ID field 572, and a VLAN identifier field 574. Trunk interface ID field 572 may store an ID that uniquely identifies the particular trunk interface, such as the name of the trunk interface. VLAN identifier field 574 may store information about a particular VLAN identifier associated with the particular trunk interface in the Layer 2 domain.

Layer 3 device field 580 may store information about a particular Layer 3 device associated with the particular Layer 2 domain. Layer 3 device field 580 may include a Layer 3 device ID field 582, and a VLAN identifier field 584. Layer 3 device ID field 582 may store an ID that uniquely identifies the particular Layer 3 device, such as an IP address associated with the Layer 3 device and/or a name associated with the Layer 3 device. VLAN identifier field 584 may store information about a particular VLAN identifier associated with the particular Layer 3 device in the Layer 2 domain.

Routing and forwarding table 590 may include a routing and forwarding table associated with the particular Layer 2 domain. For example routing and forwarding table 590 may relate a particular destination address (e.g., MAC address) with a particular output interface.

Although FIG. 5B shows exemplary components of routing instances memory 455, in other implementations, routing instances memory 455 may include fewer fields, different fields, differently arranged fields, or additional fields than depicted in FIG. 5B.

Figure 6:
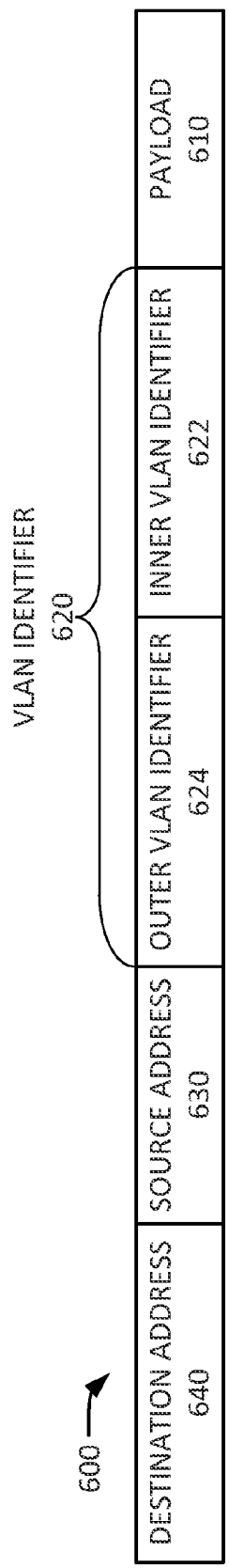
FIG. 6 is a diagram of an exemplary data unit according to an implementation described herein.

FIG. 6 is a diagram of an exemplary data unit 600 according to an implementation described herein. Data unit 600 may correspond to an Ethernet frame. As shown in FIG. 6, data unit 600 may include a payload field 610, a VLAN identifier field 620, a source address field 630, and a destination address field 640. Payload field 610 may store the data included in data unit 610. VLAN identifier 620 may include an inner VLAN identifier 622 and an outer VLAN identifier 624. Inner VLAN identifier 622 may correspond to a first 12 bit VLAN identifier and outer VLAN identifier 624 may correspond to a second 12 bit VLAN identifier. Inner VLAN identifier 622 and outer VLAN identifier 624 may identify a particular Layer 2 domain associated with data unit 600 on a particular access link 112 or a particular trunk link 116. Source address 630 may include a MAC address of a first device 115 that sent data unit 600 and destination address 640 may include a MAC address of a second device 115 that is the intended recipient of data unit 600.

Although FIG. 6 shows exemplary components of data unit 600, in other implementations, data unit 600 may include fewer fields, different fields, differently arranged fields, or additional fields than depicted in FIG. 6. For example, data unit 600 may include inner VLAN identifier 622 and may not include outer VLAN identifier 624.

Figure 7:
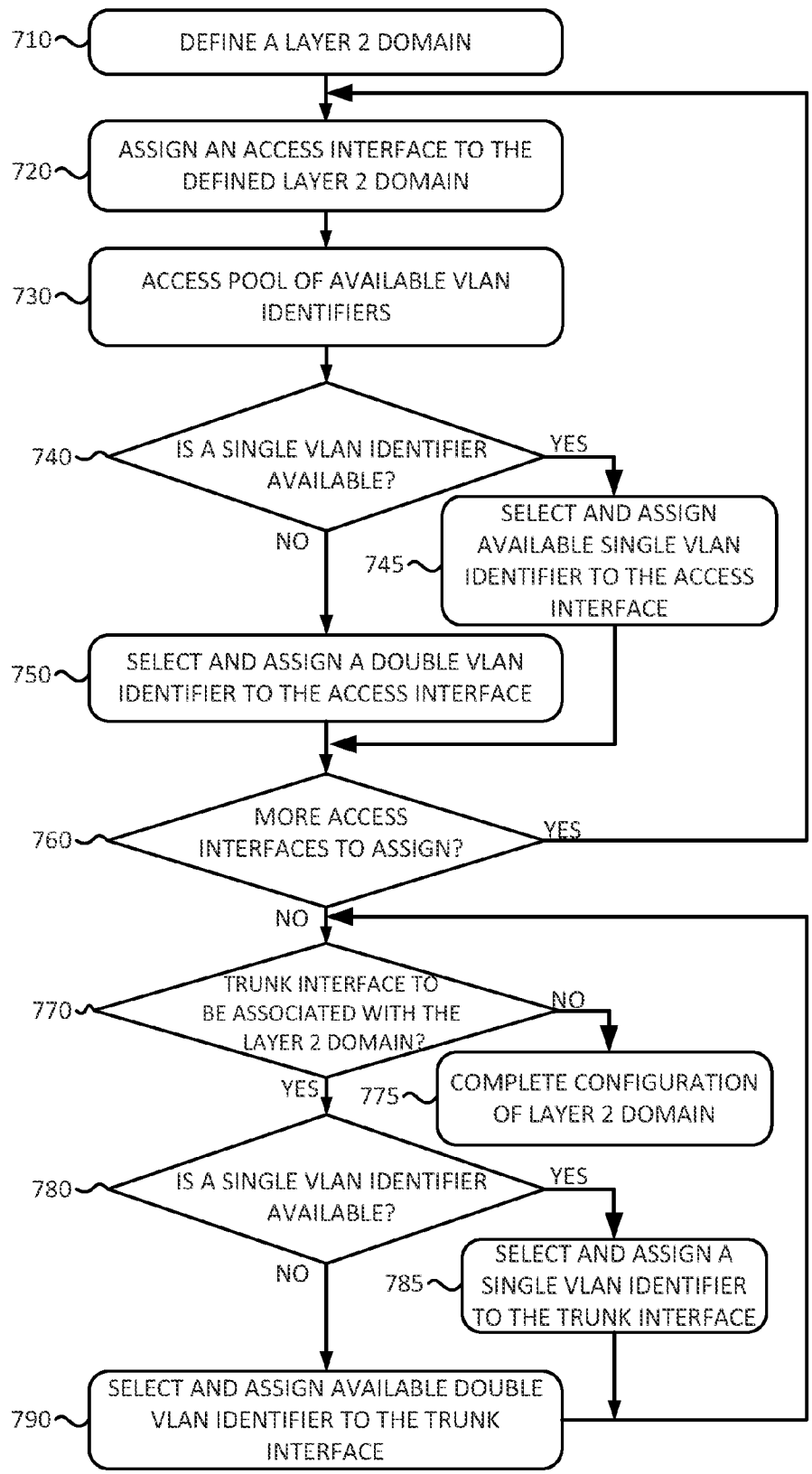
FIG. 7 is a flow chart of an exemplary process for configuring a Layer 2 domain according to an implementation described herein.

FIG. 7 is a flow chart of an exemplary process for configuring a Layer 2 domain according to an implementation described herein. In one implementation, the process of FIG. 7 may be performed by Layer 2 device 110. In other implementations, some or all of the process of FIG. 7 may be performed by another device or a group of devices separate from Layer 2 device 110 and/or including Layer 2 device 110.

The process of FIG. 7 may include defining a Layer 2 domain (block 710). For example, Layer 2 domain manager 410 may create a new Layer 2 domain in Layer 2 device 110. Distinct Layer 2 domains may be associated, for example, with distinct devices, distinct customers, distinct departments, distinct services, or distinct application, and a new Layer 2 domain may be created when data associated with a new device, new customer, new department, new service, or a new application needs to be switched through Layer 2 device 110, Layer 2 domain manager 410 may generate a new Layer 2 domain record 501 and may create a Layer 2 domain ID. In one implementation, the new Layer 2 domain may be defined by defining a new bridge domain. In another implementation, the new Layer 2 domain may be defined using another technique.

An access interface may be assigned to the defined Layer 2 domain (block 720). For example, device 115-A1 may be connected to Layer 2 device 110-A via access link 116-A1, and device 115-A1 may be associated with the defined Layer 2 domain. Thus, Layer 2 domain manager 410 may assign the access interface of Layer 2 device 110-A, associated with access link 116-A1, to the defined Layer 2 domain. A pool of available VLAN identifiers may be accessed (block 730) and a determination may be made as to whether a single VLAN identifier is available for the access interface (block 740). If a single VLAN identifier is available (block 740—YES), then the available single VLAN identifier may be selected and assigned to the access interface for the Layer 2 domain (block 745). If a single VLAN identifier is not available (block 740—NO), then a double VLAN identifier may be selected and assigned to the access interface for the Layer 2 domain (block 750).

For example, Layer 2 domain manager 410 may access VLAN identifiers memory 415 to determine which VLAN identifiers are available for the assigned access interface. Each Layer 2 domain to which the access interface has been assigned may have a VLAN identifier assigned to the access interface. If the number of Layer 2 domains associated with the assigned interface exceeds a particular number (e.g., 4,096 Layer 2 domains), the number of single VLAN identifiers for the access interface may be exhausted. If the number of single VLAN identifiers has been exhausted, a double VLAN identifier may be selected.

Returning to FIG. 7, a determination may be made as to whether there are more access interfaces to be assigned (block 760). For example, Layer 2 domain manager 410 may determine whether additional devices 115 are to be associated with the defined Layer 2 domain. If it is determined that there are more access interfaces to be assigned (block 760—YES), processing may return to block 720. If it is determined that there are no more access interface to be assigned (block 760—NO), a determination may be made as to whether there is a trunk interface to be associated with the Layer 2 domain (block 770). If it is determined that there is no trunk interface to be associated with the Layer 2 domain (block 770—NO), configuration of the Layer 2 domain may be completed (block 775).

If it is determined that there is a trunk interface to be associated with the Layer 2 domain (block 770—YES), Layer 2 trunking manager 430 may proceed to assign a VLAN identifier to the trunk interface for the Layer 2 domain. For example, Layer 2 trunking manager 430 may access trunk interfaces configuration memory 435 to identify trunk interfaces associated with Layer 2 device 110. Layer 2 trunking manager 430 may advertise the new Layer 2 domain on all the trunk interfaces (FIGS. 12A and 12B describe this process in more detail). The Layer 2 domain may have been previously defined on another Layer 2 device and the other Layer 2 device may have sent out an advertisement message about the Layer 2 domain, which may have been received via a particular trunking interface. Thus, Layer 2 trunking manager 430 may have previously associated the particular trunking interface with the Layer 2 domain. Additionally or alternatively, Layer 2 device 110 may receive a response via a particular trunk interface, indicating that another device, reachable via the particular trunking interface, is associated with the Layer 2 domain. In response, Layer 2 trunking manager 430 may associate the particular trunk interface with the Layer 2 domain.

A determination may be made as to whether a single VLAN identifier is available for the trunk interface (block 780). If a single VLAN identifier is available (block 780—YES), then the available single VLAN identifier may be selected and assigned to the trunk interface for the Layer 2 domain (block 785). If a single VLAN identifier is not available (block 780—NO), then a double VLAN identifier may be selected and assigned to the trunk interface for the Layer 2 domain (block 790).

Figure 8:
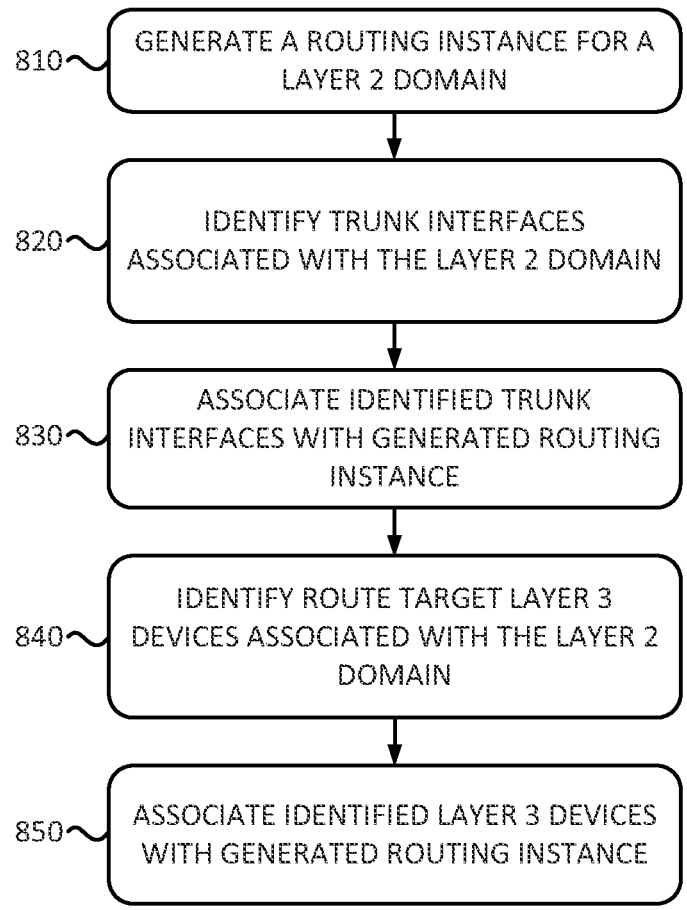
FIG. 8 is a flow chart of an exemplary process for configuring a routing instance associated with a Layer 2 domain according to an implementation described herein.

FIG. 8 is a flow chart of an exemplary process for configuring a routing instance associated with a Layer 2 domain according to an implementation described herein. In one implementation, the process of FIG. 8 may be performed by Layer 3 device 120. In other implementations, some or all of the process of FIG. 8 may be performed by another device or a group of devices separate from Layer 3 device 120 and/or including Layer 3 device 120.

The process of FIG. 8 may include generating a routing instance for a Layer 2 domain (block 810). For example, Layer 2 domain trunking manager 470 of Layer 3 device 120 may receive an advertisement message, via trunk link 112 from Layer 2 device 110 or via virtual connection 122 from another Layer 3 device 120, indicating that a new Layer 2 domain has been created. In response, Layer 2 domain trunking manager 470 may instruct routing instances manager 450 to generate a new routing instance record 551 for the new Layer 2 domain.

Trunk interfaces associated with the Layer 2 domain may be identified (block 820) and the identified trunk interfaces may be associated with the generated routing instance (block 830). For example, if the advertisement message was received via trunk link 112, Layer 2 domain trunking manager 470 may identify the trunk interface associated with trunk link 112 as being associated with the Layer 2 domain and the associated routing instance. Furthermore, the advertisement message may include information identifying a VLAN identifier for trunk link 112 and Layer 2 domain trunking manager 470 may associate the VLAN identifier with the trunk interface. As another example, if the advertisement message was received from another Layer 3 device 120, Layer 2 domain trunking manager 470 may forward the advertisement message via all trunk interfaces. Layer 2 domain trunking manager 470 may receive a response from a particular trunk interface, indicating that the Layer 2 domain has been defined on a Layer 2 device 110 reachable via the particular trunk interface. In response, Layer 2 domain trunking manager 470 may associate the particular trunk interface with the Layer 2 domain and the associated routing instance.

Layer 3 devices associated with the Layer 2 domain may be identified (block 840) and the identified Layer 3 devices may be associated with the generated routing instance (block 850). For example, if the advertisement message was received via virtual connection 122 from another Layer 3 device, Layer 2 domain trunking manager 470 may identify the Layer 3 device associated with virtual connection 122 as associated with the Layer 2 domain and the associated routing instance. Furthermore, the advertisement message may include information identifying a VLAN identifier for virtual connection 122 and Layer 2 domain trunking manager 470 may associate the VLAN identifier with virtual connection 122 to Layer 3 device. As another example, if the advertisement message was received from Layer 2 device 110 via trunk link 112, Layer 2 domain trunking manager 470 may forward the advertisement message via all virtual connections 122. Layer 2 domain trunking manager 470 may receive a response from a particular Layer 3 device, indicating that the Layer 2 domain has been defined on a Layer 3 device 120 reachable via the particular virtual connection 122 associated with the particular Layer 3 device. In response, Layer 2 domain trunking manager 470 may associate the particular Layer 3 device with the Layer 2 domain and the associated routing instance.

Figure 9:
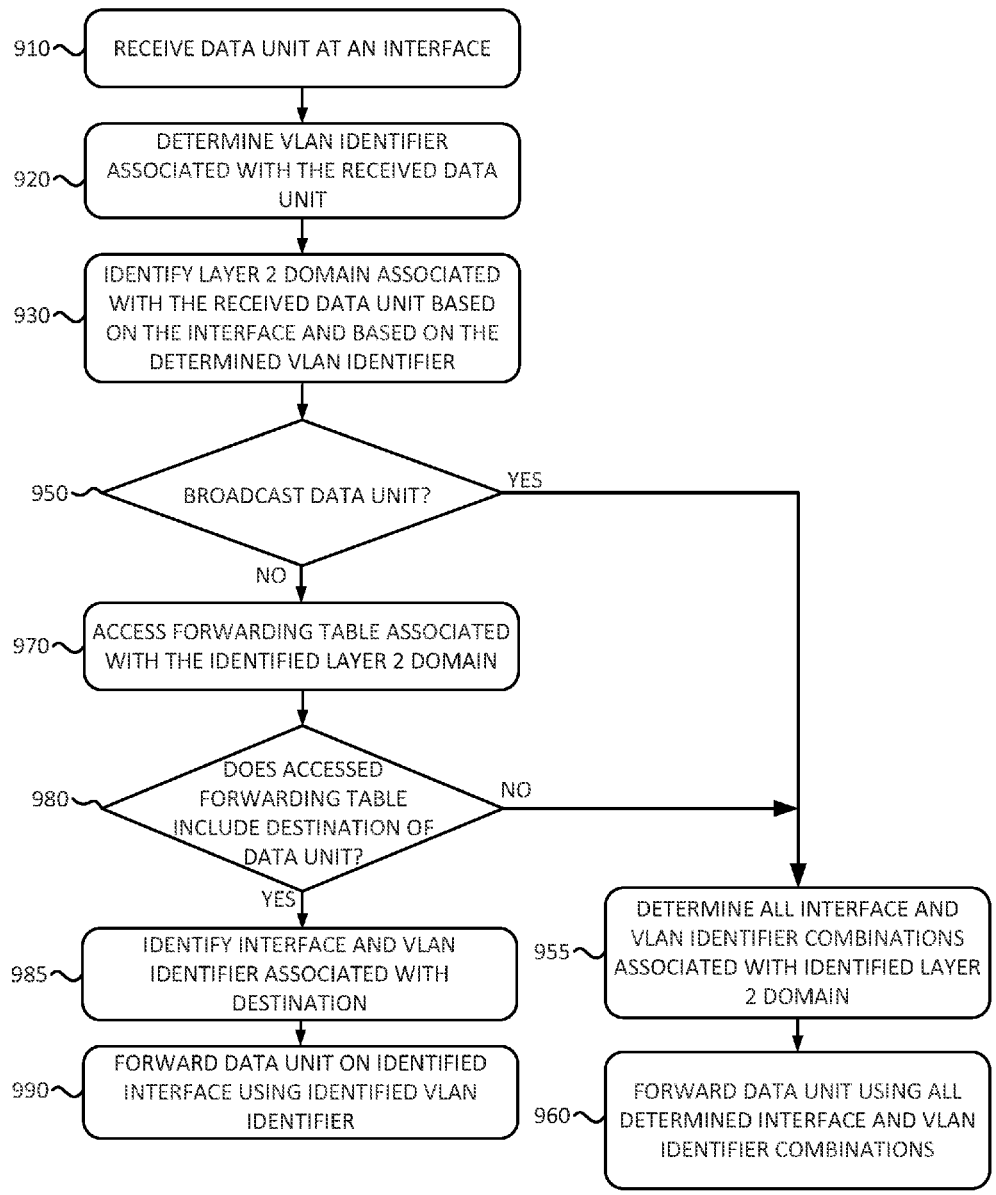
FIG. 9 is a flow chart for processing a data unit associated with a Layer 2 domain in a Layer 2 device according to an implementation described herein.

FIG. 9 is a flow chart for processing a data unit associated with a Layer 2 domain in a Layer 2 device according to an implementation described herein. In one implementation, the process of FIG. 9 may be performed by Layer 2 device 110. In other implementations, some or all of the process of FIG. 9 may be performed by another device or a group of devices separate from Layer 2 device 110 and/or including Layer 2 device 110.

The process of FIG. 9 may include receiving a data unit at an interface (block 910). For example, Layer 2 device 110 may receive an Ethernet frame at an access interface from device 110 via access link 116. A VLAN identifier associated with the received data unit may be determined (block 920). For example, forwarding engine 420 may extract an IEEE 802.1Q header from the Ethernet frame and retrieve either a single or a double VLAN tag. A Layer 2 domain associated with the received data unit may be identified based on the interface and based on the determined VLAN identifier (block 930). For example, forwarding engine 420 may access Layer 2 domain record 501 to determine which Layer 2 domain has the determined VLAN identifier assigned to the interface.

At this point, or at a different point during the process of FIG. 9, forwarding engine 420 may perform MAC learning on the received data unit (not shown in FIG. 9). For example, forwarding engine 420 may determine whether the source MAC address of the received data unit is included in forwarding table 530 associated with the identifier Layer 2 domain. If the source MAC address of the received data unit is not included in forwarding table 530, forwarding engine 420 may associate the source MAC address with the interface via which the data unit was received in forwarding table 530.

A determination may be made as to whether to broadcast the data unit (block 950). For example, the data unit may correspond to an Ethernet broadcast frame. If it is determined that the data unit is to be broadcast (block 950—YES), all interfaces and VLAN identifier combinations associated with the identifier Layer 2 domain may be determined (block 955). For example, forwarding engine 420 may access Layer 2 domain record 501 to identify all access interfaces and/or all trunk interfaces associated with the Layer 2 domain. For each particular access interface or trunk interface, forwarding engine 420 may determine which VLAN identifier has been assigned to the particular access interface or trunk interface for the Layer 2 domain. The data unit may be forwarded using all the determined interface and VLAN identifier combinations (block 960).

Returning to block 950, if it is determined that the data unit is not to be broadcast (block 950—NO), a forwarding table associated with the Layer 2 interface may be accessed (block 970) and a determination may be made as to whether the accessed forwarding table includes the destination of the data unit (block 980). For example, forwarding engine 420 may access forwarding table 530 of Layer 2 domain record 501 associated with the identified Layer 2 domain and determine whether forwarding table 530 associates a particular interface with the destination MAC address of the received Ethernet frame.

If it is determined that the forwarding table does not include information about the destination of the data unit (block 980—NO), processing may continue to blocks 955 and 960 to flood the data unit. If it is determined that the forwarding table does include information about the destination of the data unit (block 980—YES), an interface and VLAN identifier associated with the destination may be identified (block 985). For example, forwarding engine 420 may identify the interface via which the Ethernet frame should be forwarded based on interface field 522. The interface may correspond to an access interface or to a trunk interface, Forwarding engine 420 may further identify the VLAN identifier assigned to the interface for the Layer 2 domain based on VLAN identifier field 524. Moreover, forwarding engine 420 may apply a policy to the Ethernet frame based on policy field 526 associated with the identifier interface. The data unit may be forwarded on the identified interface using the identified VLAN identifier (block 990). For example, forwarding engine 420 may replace the existing IEEE 802.1Q header with a new IEEE 802.1Q header that includes the identifier VLAN identifier and may forward the Ethernet frame via the identified interface. Thus, the VLAN identifier in the data unit, when the data unit leaves Layer 2 device 110, may be different from the VLAN identifier that was included in the data unit when the data unit was received by Layer 2 device 110.

Figure 10:
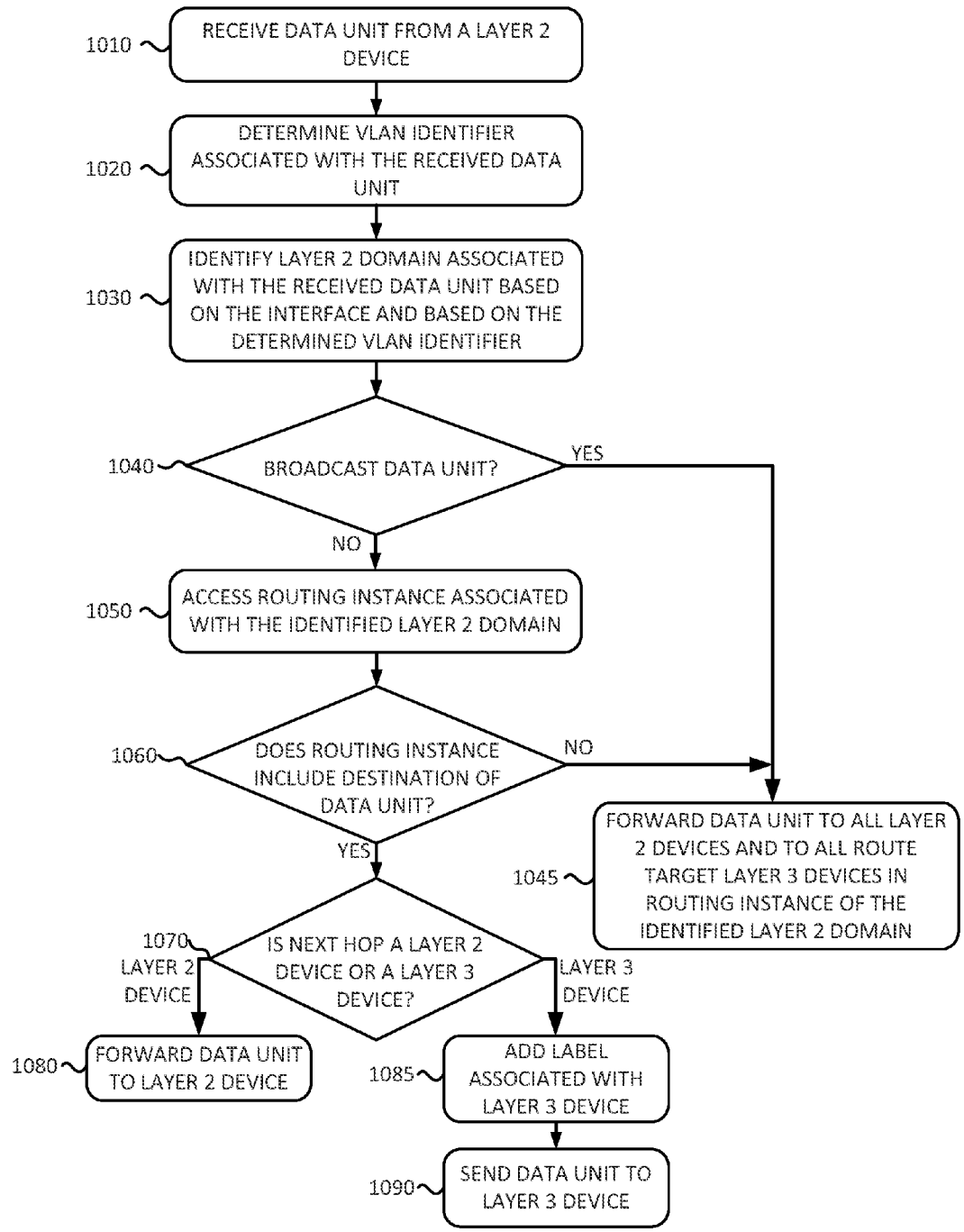
FIG. 10 is a flow chart for processing a data unit associated with a Layer 2 domain in a Layer 3 device, when the data unit is received from a Layer 2 device, according to an implementation described herein.

FIG. 10 is a flow chart for processing a data unit associated with a Layer 2 domain in a Layer 3 device, when the data unit is received from a Layer 2 device, according to an implementation described herein. In one implementation, the process of FIG. 10 may be performed by Layer 3 device 120. In other implementations, some or all of the process of FIG. 10 may be performed by another device or a group of devices separate from Layer 3 device 120 and/or including Layer 3 device 120.

The process of FIG. 10 may include receiving a data unit from a Layer 2 device (block 1010). For example, Layer 3 device 120 may receive an Ethernet frame from Layer 2 device 110 via trunk link 112. A VLAN identifier associated with the received data unit may be determined (block 1020). For example, routing and forwarding engine 460 may extract an IEEE 802.1Q header from the Ethernet frame and retrieve either a single or a double VLAN tag. A Layer 2 domain associated with the received data unit may be identified based on the trunk interface and based on the determined VLAN identifier (block 1030). For example, routing and forwarding engine 460 may access Layer 2 domain record 551 to determine for which Layer 2 domain has the determined VLAN identifier been assigned to the trunk interface.

A determination may be made as to whether to broadcast the data unit (block 1040). For example, the data unit may correspond to an Ethernet broadcast frame. If it is determined that the data unit is to be broadcast (block 1040—YES), the data unit may be forwarded to all Layer 2 devices and to all route target Layer 3 devices in the routing instance of the identified Layer 2 domain (block 1045). For example, routing and forwarding engine 460 may identify all trunk interfaces associated with the Layer 2 domain. For each of the identified trunk interfaces, routing and forwarding engine 460 may identify the VLAN identifier assigned to a particular trunk interface for the Layer 2 domain, may change the IEEE 802.1Q header for the Ethernet frame to include the identified VLAN identifier, and may forward the Ethernet frame via the particular trunk interface. Furthermore, routing and forwarding engine 460 may identify all route target Layer 3 devices 120 associated with the Layer 2 domain. For each of the identified Layer 3 devices 120, routing and forwarding engine 460 may identify the VLAN identifier assigned to a particular route target Layer 3 device 120, may change the IEEE 802.1Q header for the Ethernet frame to include the identified VLAN identifier, may encapsulate the Ethernet frame using a label associated with the particular Layer 3 device 120, and may route the encapsulated frame via output interface 230 associated with the particular Layer 3 device 120.

If it is determined that the data unit is not to be broadcast (block 1040—NO), a routing instance associated with the Layer 2 domain may be accessed (block 1050) and a determination may be made as to whether the routing instance includes the destination of the data unit (block 1060). For example, routing and forwarding engine 460 may access routing and forwarding table 590 to determine whether the destination of the data unit is associated with a particular output port 230, associated with trunk link 112 leading to another Layer 2 device 110, or associated with another Layer 3 device 120. If it is determined that the routing instance does not include information about the destination of the data unit (block 1060—NO), processing may continue to block 1045 to flood the data unit. If it is determined that the routing does include information about the destination of the data unit (block 1060—YES), a determination may be made as to whether the next hop is a Layer 2 device or a Layer 3 device (block 1070). For example, routing and forwarding engine 460 may determine whether the particular output port 230 is associated with trunk link 112 to Layer 2 device 110 or with a next hop destination leading to Layer 3 device 120.

If it is determined that the next hop destination is a Layer 2 device (block 1070—LAYER 2 DEVICE), the data unit may be forwarded to the Layer 2 device. For example, routing and forwarding engine 460 may identify the trunk interface via which the Ethernet frame should be forwarded and may further identify the VLAN identifier assigned to the trunk interface for the Layer 2 domain. Routing and forwarding engine 460 may replace the existing IEEE 802.1Q header with a new IEEE 802.1Q header that includes the identifier VLAN identifier and may forward the Ethernet frame on trunk link 116 via the identified interface.

If it is determined that the next hop destination is a Layer 3 device (block 1070—LAYER 3 DEVICE), a label associated with a Layer 3 device may be added (block 1085) and the data unit may be sent to the Layer 3 device (block 1090). For example, routing and forwarding engine 460 may identify the Layer 3 device, may further identify the VLAN identifier assigned to Layer 3 device for the Layer 2 domain, and may replace the existing IEEE 802.1Q header with a new IEEE 802.1Q header that includes the identifier VLAN identifier. Furthermore, routing and forwarding engine 460 may further identify a Multi-Protocol Label Switching (MPLS) label associated with the Layer 3 device, may encapsulate the Ethernet frame using the identifier MPLS label, may encapsulate the Ethernet frame further into an IP packet, and may forward the resulting packet via output interface 230 associated with the identifier Layer 3 device.

Figure 11:
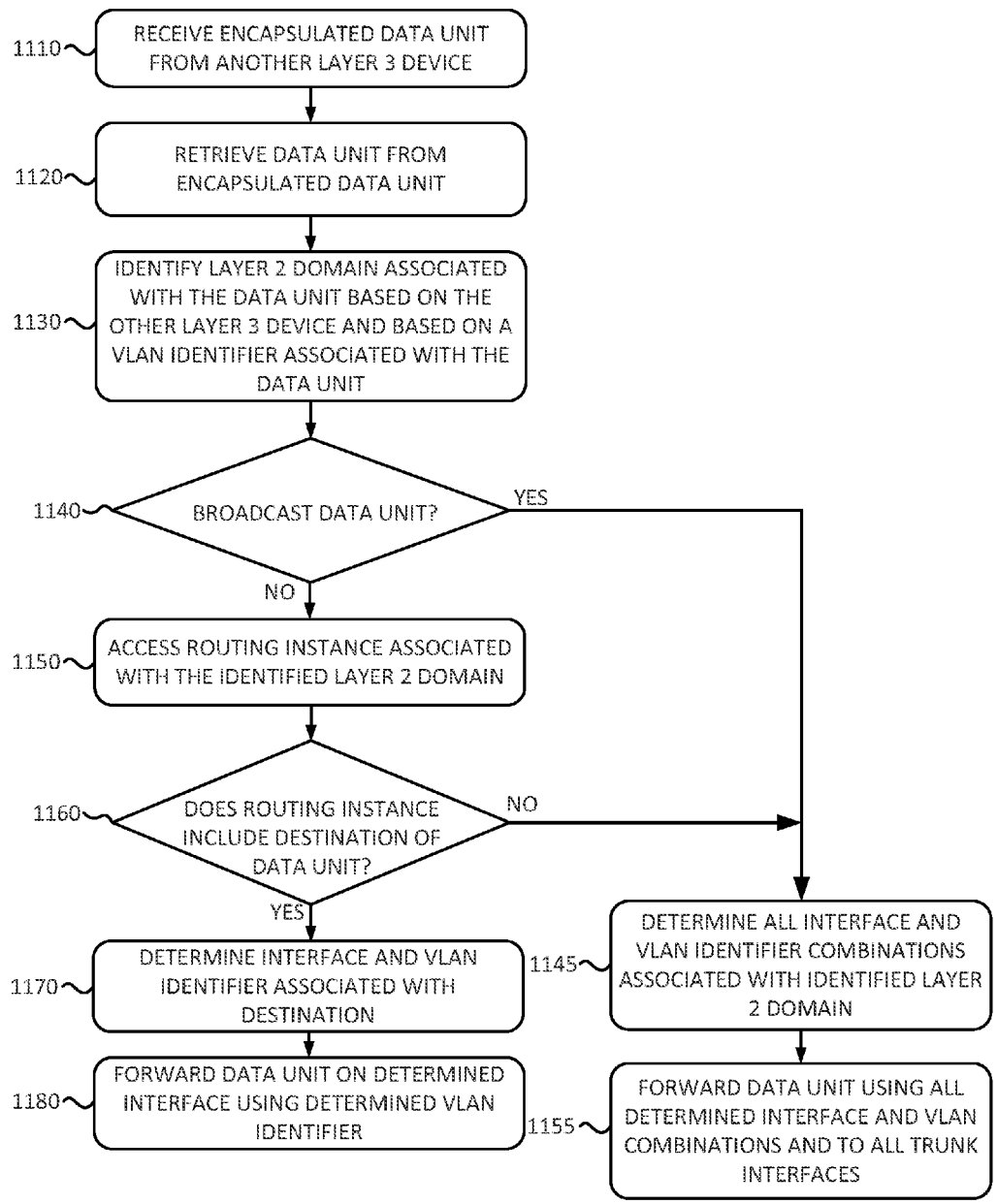
FIG. 11 is a flow chart for processing a data unit associated with a Layer 2 domain in a Layer 3 device, when the data unit is received from another Layer 3 device, according to an implementation described herein.

FIG. 11 is a flow chart for processing a data unit associated with a Layer 2 domain in a Layer 3 device, when the data unit is received from another Layer 3 device, according to an implementation described herein. In one implementation, the process of FIG. 11 may be performed by Layer 3 device 120. In other implementations, some or all of the process of FIG. 11 may be performed by another device or a group of devices separate from Layer 3 device 120 and/or including Layer 3 device 120.

The process of FIG. 11 may include receiving an encapsulated data unit from another Layer 3 device (block 1110) and retrieving the data unit from the encapsulated data unit (block 1120). For example, Layer 3 device 120 may receive an Ethernet frame encapsulated in an IP packet that includes an MPLS label associated with Layer 3 device 120 and may retrieve the Ethernet frame.

A Layer 2 domain, associated with the data unit, may be identified based on the other Layer 3 device and based on the VLAN identifier associated with the data unit (block 1130). For example, routing and forwarding engine 460 may extract an IEEE 802.1Q header from the Ethernet frame and retrieve either a single or a double VLAN tag. Furthermore, routing and forwarding engine 460 may identify the Layer 3 device from which the encapsulated data unit originated based on, for example, an IP source address included in the packet that included the Ethernet frame. A Layer 2 domain associated with the received data unit may be identified based on the videntified VLAN identifier and based on the identified Layer 3 device by identifying Layer 2 domain record 551 of routing instances memory 455 that includes a Layer 3 device field 580 with the identified Layer 3 device and VLAN identifier.

A determination may be made as to whether to broadcast the data unit (block 1140). For example, the data unit may correspond to an Ethernet broadcast frame. If it is determined that the data unit is to be broadcast (block 1140—YES), all interfaces and VLAN identifier combinations associated with the identifier Layer 2 domain may be determined (block 1145). For example, forwarding engine 420 may access Layer 2 domain record 501 to identify all trunk interfaces associated with the Layer 2 domain. For each particular trunk interface, forwarding engine 420 may determine which VLAN identifier has been assigned to the particular trunk interface for the Layer 2 domain. The data unit may be forwarded using all the determined interfaces and VLAN identifier combinations (block 1155).

Returning to block 1140, if it is determined that the data unit is not to be broadcast (block 1140—NO), a routing instance associated with the Layer 2 domain may be accessed (block 1150) and a determination may be made as to whether the routing instance includes the destination of the data unit (block 1160). For example, routing and forwarding engine 460 may access routing and forwarding table 590 to determine whether the destination of the data unit is associated with a particular output port 230, associated with trunk link 112 leading to another Layer 2 device. If it is determined that the routing instance does not include information about the destination of the data unit (block 1160—NO), processing may continue to block 1145 to flood the data unit. If it is determined that the routing does include information about the destination of the data unit (block 1160—YES), an interface and VLAN identifier associated with the destination may be identified (block 1170). For example, routing and forwarding engine 460 may identify the trunk interface via, which the Ethernet frame should be forwarded, may identify the VLAN identifier assigned to the interface for the Layer 2 domain based on VLAN identifier field 524. The data unit may be forwarded on the identified interface using the identified VLAN identifier (block 1180). For example, routing and forwarding engine 460 may replace the existing IEEE 802.1Q header with a new IEEE 802.1Q header that includes the identifier VLAN identifier and may forward the Ethernet frame via the identified trunk interface.

Figure 12A:
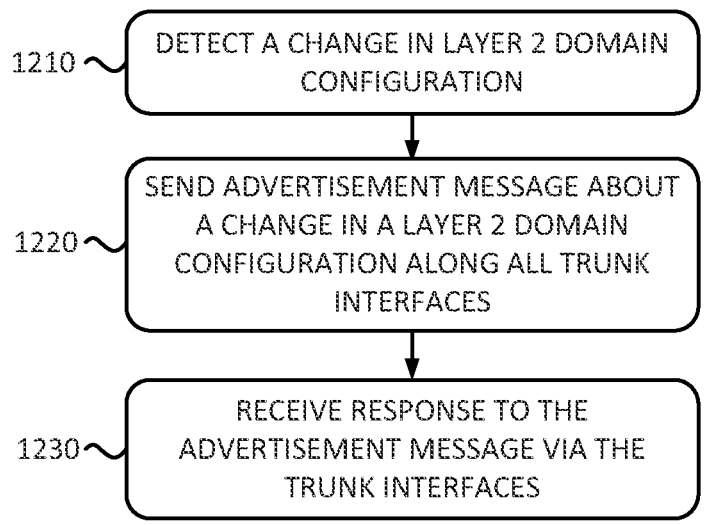
FIG. 12A is a flow chart for sending a Layer 2 domain trunking advertisement message in response to changing the Layer 2 domain configuration in a device according to an implementation described herein.

FIG. 12A is a flow chart for sending a Layer 2 domain trunking advertisement message in response to changing the Layer 2 domain configuration in a device according to an implementation described herein. In one implementation, the process of FIG. 12A may be performed by Layer 2 device 110. In other implementations, some or all of the process of FIG. 12A may be performed by another device or a group of devices separate from Layer 2 device 110 and/or including Layer 2 device 110.

The process of FIG. 12A may include detecting a change in a Layer 2 domain configuration (block 1210). For example, Layer 2 domain manager 410 may create, delete, or rename a Layer 2 domain, or may otherwise change the configuration of Layer 2 domains in Layer 2 device 110. Layer 2 trunking manager 430 may detect the change in the configuration of Layer 2 domains in Layer 2 device 110.

An advertisement message about the change in the Layer 2 domain configuration may be sent along all trunk interfaces (block 1220). For example, in response to detecting the change in the configuration of Layer 2 domains in Layer 2 device 110 (e.g., when a new Layer 2 domain has been defined in Layer 2 device 110), Layer 2 trunking manager 430 may generate an advertisement message about the Layer 2 domain configuration change using a Layer 2 domain trunking protocol. The advertisement message may include information identifying the particular Layer 2 domain trunking protocol, information identifying the type of message associated with the particular Layer 2 domain trunking protocol, a VLAN identifier associated with a particular trunk interface, and/or information identifying the change in the configuration of Layer 2 domains in Layer 2 device 110. The advertisement message may be sent along all trunk links 112 associated with Layer 2 device 110 via a particular trunk interface including the particular VLAN identifier assigned to the particular trunk interface for the Layer 2 domain.

A response to the advertisement message may be received via the trunk interfaces (block 1230). For example, Layer 2 device 110 may receive a response from another Layer 2 device 110, or from Layer 3 device 120, acknowledging receipt of the advertisement message. If an acknowledgement receipt is not received within a particular length of time via a particular trunk interface, Layer 2 device 110 may resend the advertisement message via the particular trunk interface. Additionally or alternatively, the response, received from a particular Layer 2 device 110 or Layer 3 device 120, may include information indicating that the particular Layer 2 device 110 or Layer 3 device 120 is associated with the particular Layer 2 domain. For example, if the advertisement message includes information about a new Layer 2 domain X being defined on Layer 2 device 110-A, Layer 2 device 110-B may respond with an indication that Layer 2 domain X is also defined on Layer 2 device 110-B. In response, Layer 2 device 110-A may associate the trunk link to Layer 2 device 110-B with Layer 2 domain X and may assign a VLAN identifier to the trunk link for Layer 2 domain X.

Figure 12B:
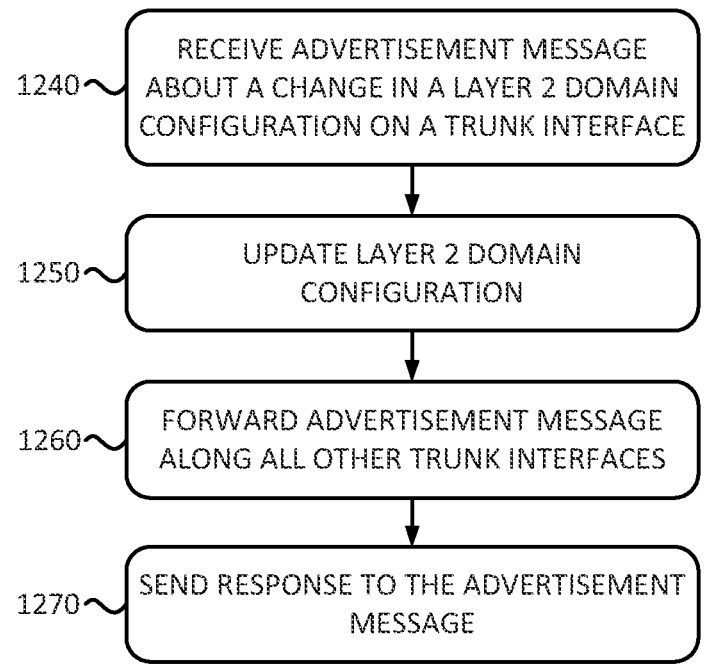
FIG. 12B is a flow chart for receiving a Layer 2 domain trunking advertisement message at a Layer 2 device according to an implementation described herein.

FIG. 12B is a flow chart for receiving a Layer 2 domain trunking advertisement message at a Layer 2 device according to an implementation described herein. In one implementation, the process of FIG. 12B may be performed by Layer 2 device 110. In other implementations, some or all of the process of FIG. 12B may be performed by another device or a group of devices separate from Layer 2 device 110 and/or including Layer 2 device 110.

The process of FIG. 12B may include receiving an advertisement message about a change in a Layer 2 domain configuration on a trunk interface (block 1240). For example, Layer 2 domain trunking manager 430 may receive an advertisement message about a change in a Layer 2 domain configuration, associated with another Layer 2 device 110, via a particular trunk interface. A Layer 2 domain configuration may be updated (block 1250). For example, Layer 2 domain trunking manager 430 may associate the particular trunk interface with the Layer 2 domain. Furthermore, if a Layer 2 domain record 501 has been defined for the Layer 2 domain associated with the advertisement message (e.g., the Layer 2 domain ID included in the advertisement message matches a Layer 2 domain ID of a Layer 2 domain record 501 on the Layer 2 device that received the advertisement message), Layer 2 domain manager 410 may update the Layer 2 domain record 501 to include the trunk interface via which the advertisement message was received, along with the associated VLAN identifier.

The advertisement message may be forwarded along all other trunk interfaces (block 1260). For example, Layer 2 domain trunking manager 430 may forward the advertisement message along all other trunk interfaces. A response to the advertisement message may be sent (block 1270). For example, Layer 2 domain trunking manager 430 may send a response to the Layer 2 device from which the advertisement message has been received, acknowledging receipt of the advertisement message. Additionally or alternatively, if a Layer 2 domain record 501 has been defined for the Layer 2 domain associated with the advertisement message, Layer 2 domain trunking manager 430 may include an indication in the response that the Layer 2 domain has been defined on the Layer 2 device.

Figure 13:
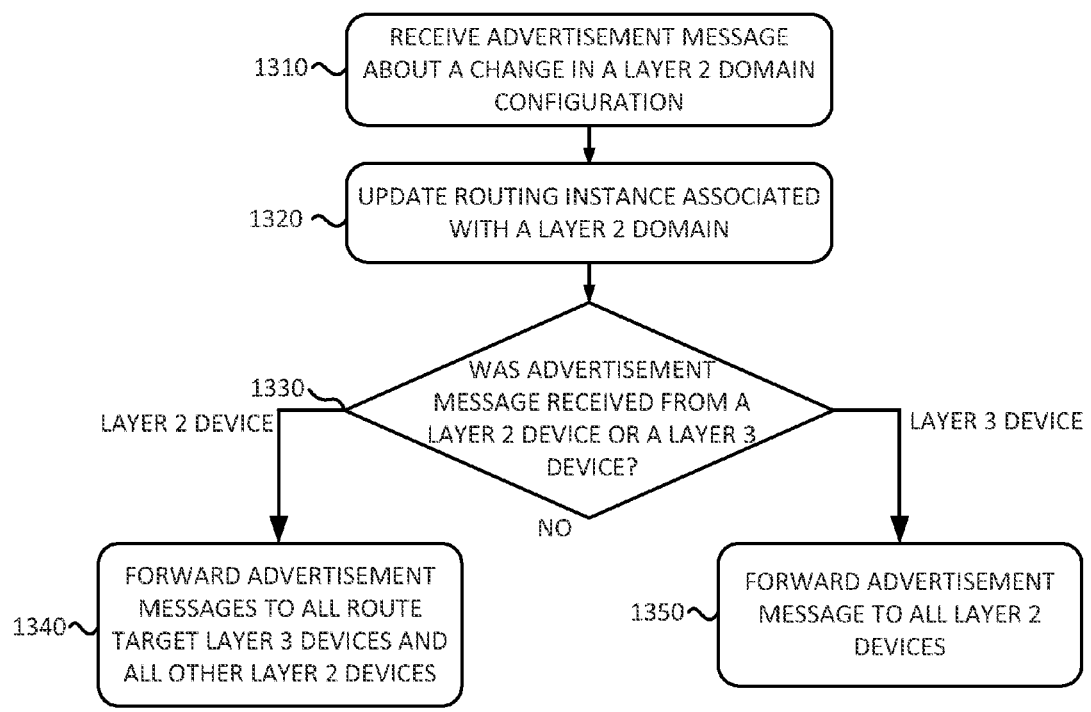
FIG. 13 is a flow chart for receiving a Layer 2 domain trunking advertisement message at a Layer 3 device according to an implementation described herein.

FIG. 13 is a flow chart for receiving a Layer 2 domain trunking advertisement message at a Layer 3 device according to an implementation described herein. In one implementation, the process of FIG. 13 may be performed by Layer 3 device 120. In other implementations, some or all of the process of FIG. 13 may be performed by another device or a group of devices separate from Layer 3 device 120 and/or including Layer 3 device 120.

The process of FIG. 13 may include receiving an advertisement message about a change in a Layer 2 domain configuration on a trunk interface (block 1310). For example, Layer 2 domain trunking manager 470 may receive an advertisement message from Layer 2 device 110 or from another Layer 3 device 120. A routing instance associated with the Layer 2 domain may be updated (block 1320). For example, Layer 2 domain trunking manager 470 may identify a particular Layer 2 domain associated with the advertisement message and may updated routing instance record 551 associated with the particular Layer 2 domain. If a routing instance record does not exist for the particular Layer 2 domain, Layer 2 domain trunking manager 470 may instruct routing instances manager 450 to generate a new routing instance record 551.

A determination may be made as to whether the advertisement message was received from a Layer 2 device or a Layer 3 device (block 1330). If the advertisement message was received from a Layer 2 device (block 1330—LAYER 2 DEVICE), the advertisement message may be forwarded to all route target Layer 3 devices and to all other Layer 2 devices connected to the Layer 3 devices via a trunk interface. For example, Layer 2 domain trunking manager 470 may access trunk interfaces and Layer 3 devices memory 475 to identify all other trunk interfaces and all route target Layer 3 devices and may forward the advertisement message to all other trunk interfaces and all route target Layer 3 devices.

If the advertisement message was received from a Layer 3 device (block 1330—LAYER 3 DEVICE), the advertisement message may be forwarded to all Layer 2 devices connected to the Layer 3 devices via a trunk interface. For example, in one implementation, in a VPN, route target Layer 3 devices may require full mesh connectivity, indicating that each route target Layer 3 device includes a virtual connection 122 to each other route target Layer 3 device in the VPN. Thus, if a Layer 3 device 120 received an advertisement message from another Layer 3 device, there may be no need to forward the advertisement message to any other Layer 3 devices, as the originating Layer 3 device will have already transmitted the advertisement message to all the Layer 3 devices associated with the VPN.

In another implementation, a VPN may include a hub configuration. In a hub configuration, a particular L3 device 120 may act as a hub that receives advertisement messages (and/or other routing information) from all L3 devices 120 associated with the VPN and may forward the advertisement messages to all other L# devices 120 associated with the VPN. Thus, in a hub configuration, if the Layer 3 device 120 is the hub, the advertisement message may be forwarded to all Layer 2 devices connected to the Layer 3 device and to all other Layer 3 devices, other than the Layer 3 device from which the advertisement message was received. If the Layer 3 device 120 is not the hub, the advertisement message may only be forwarded to all Layer 2 devices connected to the Layer 3 device.

Figure 14:
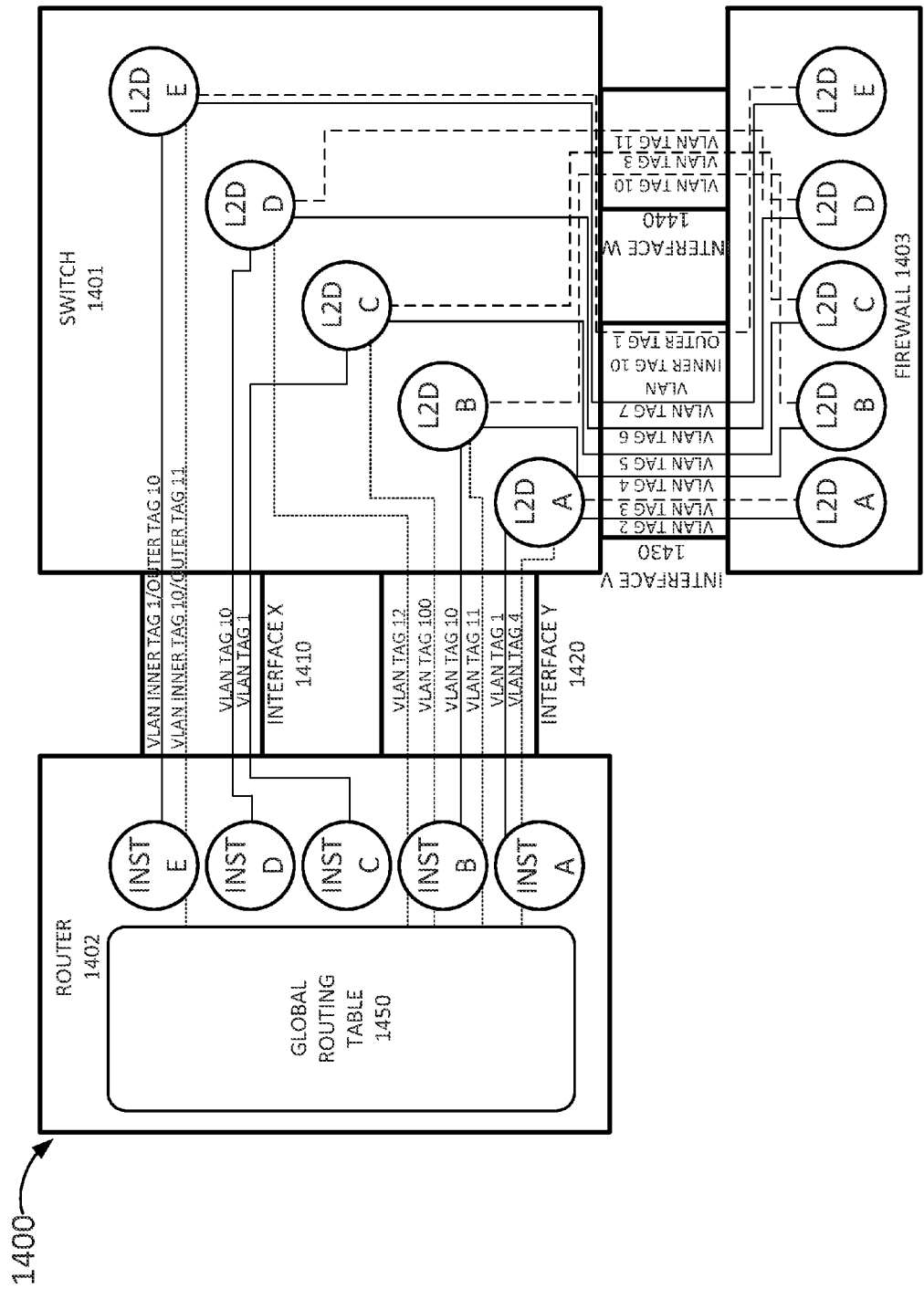
FIG. 14 is a diagram of a first example that illustrates aspects of an implementation described herein.

FIG. 14 is a diagram of a first example 1400 that illustrates aspects of an implementation described herein. Example 1400 illustrates a switch 1401 (corresponding to a Layer 2 device 110), connected to a router 1402 (corresponding to a Layer 3 device 120) via interface X 1410 and via interface Y 1420, and connected to firewall 1403 (corresponding to another Layer 2 device 110) via interface V 1430 and via interface W 1440.

Switch 1401 may include five defined Layer 2 domains: L2D A, L2D B, L2D C, L2D D, and L2D E. Router 1402 may include a L2D routing instance (INST) A that is associated with L2D A, a routing instance INST B that is associated with L2D B, a routing instance INST C that is associated with L2D C, a routing instance INST D) that is associated with L2DD, and a routing instance INST E that is associated with L2D E. Furthermore, router 1402 may also include global routing table 1450. Firewall 1403 may also include the five defined Layer 2 domains: L2D A, L2D B, L2D C, L2 D, and L2D E.

In example 1400, VLAN identifiers are referred to as VLAN tags. In L2D A, switch 1401 may exchange trusted data units with firewall 1403 over interface V 1430 using VLAN tag 2 and may exchange untrusted data units with firewall 1403 over interface V 1430 using VLAN tag 3. Furthermore, in L2D A, switch 1401 may exchange trusted data units with L2D routing instance A in router 1402 over interface Y 1410 using VLAN tag 1, and may exchange untrusted data units with global routing table 1450 over interface Y 1420 using VLAN tag 4.

In L2D B, switch 1401 may exchange trusted data units with firewall 1403 over interface V 1430 using VLAN tag 4 and may exchange untrusted data units with firewall 1403 over interface W 1440 using VLAN tag 10. Furthermore, in L2D B, switch 1401 may exchange trusted data units with L2D routing instance B in router 1402 over interface Y 1420 using VLAN tag 10, and may exchange untrusted data units with global routing table 1450 over interface Y 1420 using VLAN tag 11.

In L2D C, switch 1401 may exchange trusted data units with firewall 1403 over interface V 1430 using VLAN tag 5 and may exchange untrusted data units with firewall 1403 over interface W 1440 using VLAN tag 3. Furthermore, in L2D C, switch 1401 may exchange trusted data units with L2D routing instance C in router 1402 over interface Y 1420 using VLAN tag 100, and may exchange untrusted data units with global routing table 1450 over interface X 1410 using VLAN tag 1.

In L2D D, switch 1401 may exchange trusted data units with firewall 1403 over interface V 1430 using VLAN tag 7 and may exchange untrusted data units with firewall 1403 over interface W 1440 using VLAN tag 11. Furthermore, in L2D D, switch 1401 may exchange trusted data units with L2D routing instance D in router 1402 over interface X 1410 using VLAN tag 10, and may exchange untrusted data units with global routing table 1450 over interface Y 1420 using VLAN tag 12.

In L2D E, switch 1401 may exchange trusted data units with firewall 1403 over interface V 1430 using VLAN tag 7 and may exchange untrusted data units with firewall 1403 over interface V 1430 using a VLAN tag that includes inner VLAN tag 10 and outer VLAN tag 1. Furthermore, in L2D E, switch 1401 may exchange trusted data units with L2D routing instance E in router 1402 over interface X 1410 using a double VLAN tag that includes a VLAN inner tag 1 and a VLAN outer tag 10, and may exchange untrusted data units with global routing table 1450 over interface X 1410 using a double VLAN tag that includes a VLAN inner tag 10 and an outer VLAN tag 11.

Figure 15:
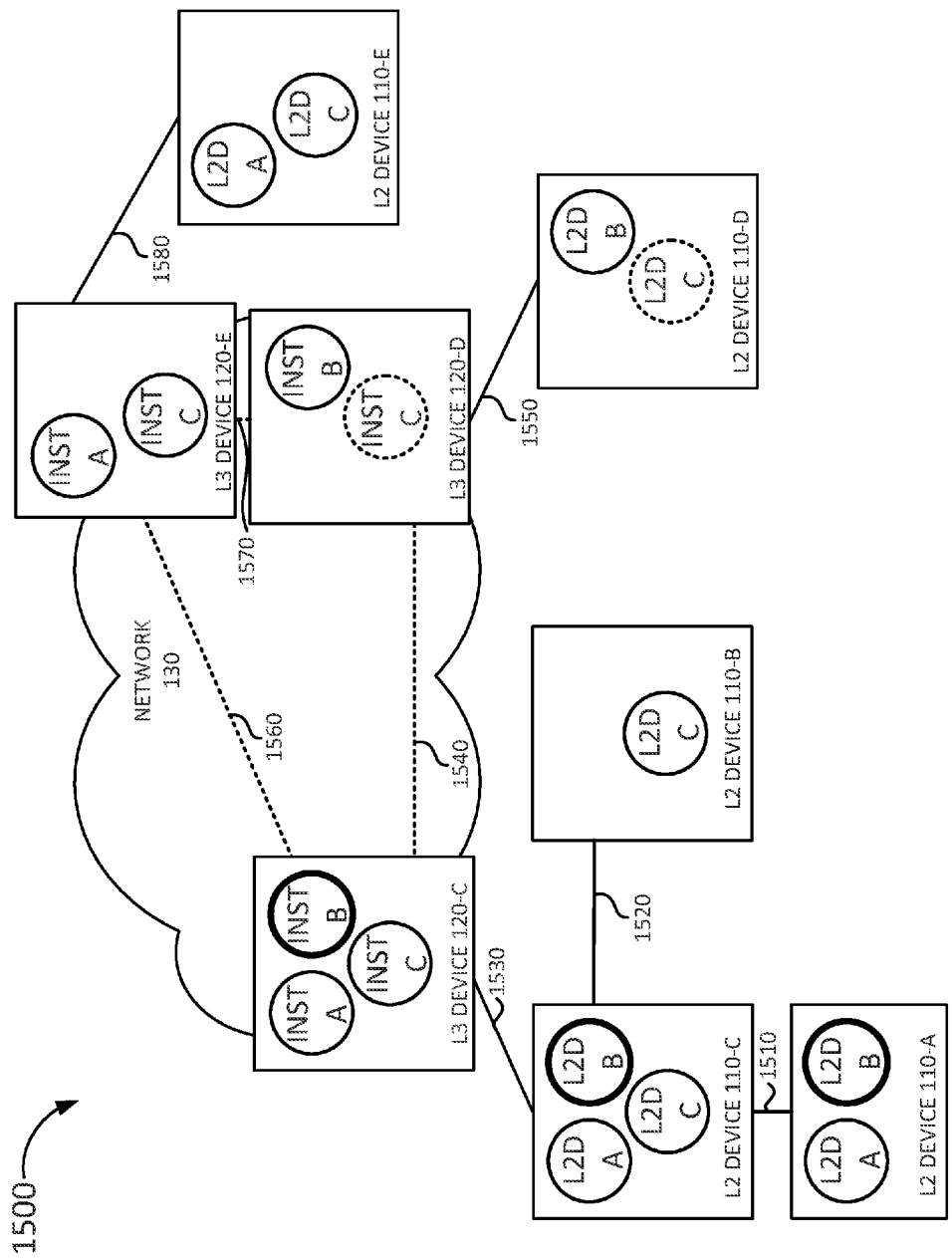
FIG. 15 is a diagram of a second example that illustrates aspects of an implementation described herein.

FIG. 15 is a diagram of a second example 1500 that illustrates aspects of an implementation described herein. Example 1500 includes a network that includes Layer 2 device 110-A connected to Layer 2 device 110-C via trunk link 1510 and Layer 2 device 110-B connected to Layer 2 device 110-C via trunk link 1520. Layer 2 device 110-C is connected to L3 device 120-C via trunk link 1530. Layer 3 device 120-C is connected to Layer 3 device 120-D via virtual connection 1540 and to Layer 3 device 120-E via virtual connection 1560. Layer 3 devices 120-D and 120-E may be connected via virtual connection 1570. Layer 3 device 120-D may be connected to Layer 2 device 110-D via trunk link 1550 and Layer 3 device 120-E may be connected to Layer 2 device 110-E via trunk link 1580.

Layer 2 device 110-E may include Layer 2 domain L2D A. L2D A may also be included in Layer 2 device 110-A and Layer 2 device 110-C. Thus, when L2 device 110-E broadcasts a frame associated with L2D A, the frame may be sent to Layer 3 device 120-E. From Layer 3 device 120-E, the frame may be broadcast to Layer 3 device 120-C, but not to Layer 3 device 120-D, because L2D routing instance (INST) A may not associate virtual connection 1570 with L2D A. From Layer 3 device 120-C, the frame may be broadcast to Layer 2 device 110-C, because L2D routing instance A in Layer 3 device 120-C may associate trunk link 1530 with L2D A. At Layer 2 device 110-C, the frame may be broadcast to both Layer 2 device 110-A and not to Layer 2 device 110-B, because in Layer 2 device 110-C, L2D A may be associated with trunk link 1510 and may not be associated with trunk link 1520.

Assume Layer 2 domain L2D B is added to Layer 2 device 110-A (shown in bold in FIG. 15). Layer 2 device 110-A may send out art advertisement message via trunk link 1510 to Layer 2 device 110-C. In response to receiving the advertisement message, Layer 2 device 110-C may create a new Layer 2 domain L2D B (shown in bold in FIG. 15) and may associate trunk link 1510 with L2D B. Layer 2 device 110-C may then send an advertisement message about the new Layer 2 domain L2D B via trunk link 1520 and trunk link 1530. Layer 2 device 110-B may receive the advertisement message. In one implementation, Layer 2 device 110-B may ignore the advertisement message, since Layer 2 device 110-B does not include L2D B and may not be forwarding any frames associated with L2D B. In another implementation, Layer 2 device 110-B may associate trunk link 1520 with L2D B even though Layer 2 device 110-B does not include L2D B.

Layer 3 device 120-C may receive the advertisement message and may create L2D routing instance B in response, Layer 3 device 120-C may further associate L2D B with trunk link 1530. Layer 3 device 120-C may further send an advertisement message about L2D B via virtual connection 1540 to Layer 3 device 120-D and via virtual connection 1560 to Layer 3 device 120-E. Layer 3 device 120-D may include L2D routing instance B, associated with L2D B, because Layer 2 device 110-D already includes L2D B. Thus, L3 device 120-D may associate Layer 3 device 120-C with L2D routing instance B.

Layer 3 device 120-E may receive the advertisement message. Since Layer 3 device 120-E received the advertisement message from another Layer 3 device 120 and Layer 3 device 120-E does not include a routing instance associated with L2D B, Layer 3 device 120-E may need to determine whether L2D B is relevant. In one implementation, Layer 3 device 120-E may simply associate virtual connection 1560 and Layer 3 device 120-C with L2D B. In another implementation, Layer 3 device 120-E may forward the advertisement message to its corresponding Layer 2 devices (Layer 2 device 110-E in this case) and wait for a response. Layer 2 device 110-E may respond with a message indicating that L2D B is not defined on Layer 2 device 110-E and Layer 3 device 120-E may determine that L2D B is not relevant. In yet another implementation, Layer 3 device 120-E may assume that L2D B is not relevant, because otherwise Layer 3 device 110-F may have received an advertisement message about L2D B from L2 device 110-E and may have generated a routing instance associated with L2D B.

Now assume that Layer 2 device 110-D includes Layer 2 domain L2D C and that L2D C is deleted on Layer 2 device 110-D (shown as dashed lines in FIG. 15). Layer 2 device 110-1) may send an advertisement message to Layer 3 device 120-D about the deletion via trunk link 1550. Layer 3 device 120-D may disassociate trunk link 1550 from L2D C. Furthermore, Layer 3 device 120-D may determine that no other Layer 2 devices, associated with Layer 3 device 120-D, include L2D C. Therefore, Layer 3 device 120-D may delete L2D routing instance C and may send an advertisement message to Layer 3 device 120-C via virtual connection 1540 and to Layer 3 device 120-E via virtual connection 1570. In response, Layer 3 device 120-C may disassociate virtual connection 1540 and Layer 3 device 120-D from L2D routing instance C associated with L2D C. Similarly, Layer 3 device 120-E may disassociate virtual connection 1570 and Layer 3 device 120-D from L2D routing instance C associated with L2D C.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of blocks have been described with respect to FIGS. 7-13, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A network device configured to:
define a Layer 2 domain, wherein the Layer 2 domain defines a data link layer broadcast domain;
assign an access interface to the Layer 2 domain;
access a pool of Virtual Local Area Network (VLAN) identifiers, associated with the access interface, to determine whether a single VLAN identifier is available;
assign the single VLAN identifier to the access interface in the Layer 2 domain, in response to determining that the single VLAN identifier is available;
assign a double VLAN identifier to the access interface in the Layer 2 domain, in response to determining that the single VLAN identifier is not available, wherein the double VLAN identifier includes an inner VLAN identifier and an outer VLAN identifier;
receive an Ethernet frame via the access interface, wherein the Ethernet frame includes the double VLAN identifier;
retrieve the double VLAN identifier from the received Ethernet frame;
identify the defined Layer 2 domain based on the Ethernet frame being received via the access interface and based on the retrieved double VLAN identifier; and
forward the Ethernet frame based on a forwarding table associated with the identified Layer 2 domain.

2. The network device of claim 1, wherein the Layer 2 domain includes a bridge domain.

3. The network device of claim 1, further configured to:
assign a trunk interface to the Layer 2 domain;
access a pool of VLAN identifiers, associated with the trunk interface, to determine whether a trunk interface single VLAN identifier is available;
assign the trunk interface single VLAN identifier to the trunk interface in the Layer 2 domain, in response to determining that the trunk interface single VLAN identifier is available; and
assign a trunk interface double VLAN identifier to the trunk interface in the Layer 2 domain, wherein the trunk interface double VLAN identifier includes an inner VLAN identifier and an outer VLAN identifier, in response to determining that the trunk interface single VLAN identifier is not available.

4. The network device of claim 1, wherein the network device includes more than 4,096 distinct Layer 2 domains.

5. The network device of claim 1, further configured to:
determine whether the received Ethernet frame corresponds to a broadcast Ethernet frame;
forward the received Ethernet frame via all access interfaces associated with the defined Layer 2 domain, in response to determining that the received Ethernet frame corresponds to the broadcast Ethernet frame; and
forward the received Ethernet frame via all trunk interfaces associated with the defined Layer 2 domain, in response to determining that the received Ethernet frame corresponds to the broadcast Ethernet frame.

6. The network device of claim 1, wherein, when forwarding the Ethernet frame based on the forwarding table associated with the identified Layer 2 domain, the network device is further configured to:
access the forwarding table associated with the defined Layer 2 domain;
determine whether a destination address, included in the received Ethernet frame, is associated with an output interface of the network device;
identify a VLAN identifier associated with the output interface in the forwarding table associated with the defined Layer 2 domain, in response to determining that the destination address is associated with the output interface; and forward the received Ethernet frame via the output interface with the identified VLAN identifier, in response to determining that the destination address is associated with the output interface.

7. The network device of claim 1, further configured to:
detect a change in a Layer 2 domain configuration of the network device;
generate a Layer 2 domain trunking advertisement message based on the detected change; and
send the Layer 2 domain trunking advertisement message via all trunk interfaces associated with the network device.

8. The network device of claim 1, further configured to:
receive a Layer 2 domain trunking advertisement message via a trunk interface;
update a Layer 2 domain configuration of the network device based on information included in the Layer 2 domain trunking advertisement message; and
forward the Layer 2 domain trunking advertisement message via all other trunk interfaces associated with the network device.

9. A network device comprising:
logic configured to:
generate a routing instance for a Layer 2 domain, wherein the Layer 2 domain defines a data link layer broadcast domain, and wherein the routing instance includes a routing table associated with the Layer 2 domain;
assign a trunk interface to the Layer 2 domain;
assign a double Virtual Local Area Network (VLAN) identifier to the trunk interface in the Layer 2 domain, wherein the double VLAN identifier includes an inner VLAN identifier and an outer VLAN identifier;
receive an Ethernet frame via the trunk interface, wherein the Ethernet frame includes the double VLAN identifier;
retrieve the double VLAN identifier from the received Ethernet frame;
identify the Layer 2 domain, based on the Ethernet frame being received via the trunk interface and based on the Ethernet frame including the assigned double VLAN identifier;
access the routing instance for the identified Layer 2 domain to determine a next hop destination for the Ethernet frame;
forward the Ethernet frame to a next hop Layer 2 device via another trunk interface, when the next hop destination corresponds to the next hop Layer 2 device; and
add a label, associated with a next hop Layer 3 device, and send the Ethernet frame to the next hop Layer 3 device, when the next hop destination corresponds to the next hop Layer 3 device.

10. The network device of claim 9, wherein the Layer 2 domain includes a bridge domain.

11. The network device of claim 9, wherein the logic is further configured to:
identify a Layer 3 device as being associated with the Layer 2 domain;
identify a VLAN identifier associated with the Layer 3 device in the Layer 2 domain; and
include the identified Layer 3 device and the associated identified VLAN identifier in the generated routing instance.

12. The network device of claim 9, wherein the logic is further configured to:
determine whether the received Ethernet frame corresponds to a broadcast Ethernet frame;
access the routing instance to identify all trunk interfaces associated with the Layer 2 domain, in response to determining that the received Ethernet frame corresponds to the broadcast Ethernet frame;
forward the received Ethernet frame via all trunk interfaces associated with the defined Layer 2 domain, in response to determining that the received Ethernet frame corresponds to the broadcast Ethernet frame;
access the routing instance to identify all Layer 3 devices associated with the Layer 2 domain, in response to determining that the received Ethernet frame corresponds to the broadcast Ethernet frame; and
route the received Ethernet frame to all the Layer 3 devices associated with the Layer 2 domain, in response to determining that the received Ethernet frame corresponds to the broadcast Ethernet frame.

13. The network device of claim 9, wherein, when forwarding the Ethernet frame to the next hop Layer 2 device via the other trunk interface, the logic is further configured to:
identify another VLAN identifier associated with the other trunk interface; and
replace the double VLAN identifier with the identified other VLAN identifier.

14. The network device of claim 9, wherein the logic is further configured to:
receive an encapsulated data unit from a Layer 3 device;
retrieve another Ethernet frame from the encapsulated data unit;
identify the other Ethernet frame as being associated with the Layer 2 domain based on the Layer 3 device and based on a VLAN identifier included in the other Ethernet frame; and
forward the other Ethernet frame via at least one trunk interface associated with the Layer 2 domain.

15. The network device of claim 9, wherein the logic is further configured to:
receive a Layer 2 domain trunking advertisement message;
update a routing instance associated with a Layer 2 domain associated with the received Layer 2 domain trunking advertisement message;
determine whether the Layer 2 domain trunking advertisement message was received from a Layer 2 device or a Layer 3 device;
forward the Layer 2 domain trunking advertisement message to all Layer 2 devices connected to the network device via trunk interfaces, in response to determining that the Layer 2 domain trunking advertisement message was received from a Layer 3 device; and
forward the Layer 2 domain trunking advertisement message to all route target Layer 3 devices associated with the network device, in response to determining that the Layer 2 domain trunking advertisement message was received from a Layer 2 device.

16. A method performed by a network device, the method comprising:
defining, by the network device, a Layer 2 domain, wherein the Layer 2 domain defines a data link layer broadcast domain;
assigning, by the network device, an access interface to the Layer 2 domain;

accessing, by the network device, a pool of Virtual Local Area Network (VLAN) identifiers, associated with the access interface, to determine whether a single VLAN identifier is available;

assigning, by the network device, the single VLAN identifier to the access interface in the Layer 2 domain, in response to determining that the single VLAN identifier is available;

assigning, by the network device, a double VLAN identifier to the access interface in the Layer 2 domain, in response to determining that the single VLAN identifier is not available, wherein the double VLAN identifier includes an inner VLAN identifier and an outer VLAN identifier;

receiving, by the network device, an Ethernet frame via the access interface, wherein the Ethernet frame includes the double VLAN identifier;

retrieving, by the network device, the double VLAN identifier from the received Ethernet frame;

identifying, by the network device, the defined Layer 2 domain, based on the Ethernet frame being received via the access interface and based on the retrieved double VLAN identifier; and forwarding, by the network device, the Ethernet frame based on a forwarding table associated with the identified Layer 2 domain.

17. The method of claim 16, further comprising:
assigning a trunk interface to the Layer 2 domain;
accessing a pool of VLAN identifiers, associated with the trunk interface, to determine whether a trunk interface single VLAN identifier is available;
assigning the trunk interface single VLAN identifier to the trunk interface in the Layer 2 domain, when the trunk interface single VLAN identifier is available; and
assigning a trunk interface double VLAN identifier to the trunk interface in the Layer 2 domain, wherein the trunk interface double VLAN identifier includes an inner VLAN identifier and an outer VLAN identifier, when the trunk interface single VLAN identifier is not available.

18. The method of claim 16, further comprising:
determining whether the received Ethernet frame corresponds to a broadcast Ethernet frame;
forwarding the received Ethernet frame via all access interfaces associated with the defined Layer 2 domain, when the received Ethernet frame corresponds to the broadcast Ethernet frame; and
forwarding the received Ethernet frame via all trunk interfaces associated with the defined Layer 2 domain, when the received Ethernet frame corresponds to the broadcast Ethernet frame.

19. The method of claim 16, wherein forwarding the Ethernet frame based on the forwarding table associated with the identified Layer 2 domain further includes:
accessing the forwarding table associated with the defined Layer 2 domain;
determining whether a destination address, included in the received Ethernet frame, is associated with an output interface of the network device;
identifying a VLAN identifier associated with the output interface in the forwarding table associated with the defined Layer 2 domain, when the destination address is associated with the output interface; and
forwarding the received Ethernet frame via the output interface with the identified VLAN identifier, when the destination address is associated with the output interface.

20. The method of claim 16, further comprising:
detecting a change in a Layer 2 domain configuration of the network device;
generating a Layer 2 domain trunking advertisement message based on the detected change; and
sending the Layer 2 domain trunking advertisement message via all trunk interfaces associated with the network device.

21. The method of claim 16, further comprising:
receiving a Layer 2 domain trunking advertisement message via a trunk interface;
updating a Layer 2 domain configuration of the network device based on information included in the Layer 2 domain trunking advertisement message; and
forwarding the Layer 2 domain trunking advertisement message via all other trunk interfaces associated with the network device.

22. A method performed by a network device, the method comprising:
generating, by the network device, a routing instance for a Layer 2 domain, wherein the Layer 2 domain defines a data link layer broadcast domain, and wherein the routing instance includes a routing table associated with the Layer 2 domain;
assigning, by the network device, a trunk interface to the Layer 2 domain;
assigning, by the network device, a double Virtual Local Area Network (VLAN) identifier to the trunk interface in the Layer 2 domain, wherein the double VLAN identifier includes a first VLAN identifier and a second VLAN identifier;
receiving, by the network device, an Ethernet frame via the trunk interface, wherein the Ethernet frame includes the double VLAN identifier;
retrieving, by the network device, the double VLAN identifier from the received Ethernet frame;
identifying, by the network device, the Layer 2 domain, based on the Ethernet frame being received via the trunk interface and based on the Ethernet frame including the assigned double VLAN identifier;
accessing, by the network device, the routing instance for the identified Layer 2 domain to determine a next hop destination for the Ethernet frame;
forwarding, by the network device, the Ethernet frame to a next hop Layer 2 device via another trunk interface, when the next hop destination corresponds to the next hop Layer 2 device; and
adding, by the network device, a label, associated with a next hop Layer 3 device, and sending the Ethernet frame to the next hop Layer 3 device, when the next hop destination corresponds to the next hop Layer 3 device.

23. The method of claim 22, further comprising:
identifying a Layer 3 device as being associated with the Layer 2 domain;
identifying a VLAN identifier associated with the Layer 3 device in the Layer 2 domain; and
including the identified Layer 3 device and the associated identified VLAN identifier in the generated routing instance.

24. The method of claim 22, further comprising:
determining whether the received Ethernet frame corresponds to a broadcast Ethernet frame;
accessing the routing instance to identify all trunk interfaces associated with the Layer 2 domain, when the received Ethernet frame corresponds to the broadcast Ethernet frame;

forwarding the received Ethernet frame via all trunk interfaces associated with the defined Layer 2 domain, when the received Ethernet frame corresponds to the broadcast Ethernet frame;

accessing the routing instance to identify all Layer 3 devices associated with the Layer 2 domain, when the received Ethernet frame corresponds to the broadcast Ethernet frame; and routing the received Ethernet frame to all the Layer 3 devices associated with the Layer 2 domain, when the received Ethernet frame corresponds to the broadcast Ethernet frame.

25. The method of claim 22, wherein forwarding the Ethernet frame to the next hop Layer 2 device via the other trunk interface further includes:

identifying another VLAN identifier associated with the other trunk interface; and replacing the double VLAN identifier with the identified other VLAN identifier.

26. The method of claim 22, further comprising:

receiving an encapsulated data unit from a Layer 3 device;

retrieving another Ethernet frame from the encapsulated data unit;

identifying the other Ethernet frame as being associated with the Layer 2 domain based on the Layer 3 device and based on a VLAN identifier included in the other Ethernet frame; and forwarding the other Ethernet frame via at least one trunk interface associated with the Layer 2 domain.

27. The method of claim 22, further comprising:

receiving a Layer 2 domain trunking advertisement message;

updating a routing instance associated with a Layer 2 domain associated with the received Layer 2 domain trunking advertisement message;

determining whether the Layer 2 domain trunking advertisement message was received from a Layer 2 device or a Layer 3 device;

forwarding the Layer 2 domain trunking advertisement message to all Layer 2 devices connected to the network device via trunk interfaces, when the Layer 2 domain trunking advertisement message was received from a Layer 3 device; and forwarding the Layer 2 domain trunking advertisement message to all route target Layer 3 devices associated with the network device, when the Layer 2 domain trunking advertisement message was received from a Layer 2 device.

* * * * *